(12) United States Patent
Tomioka

(10) Patent No.: US 11,061,207 B2
(45) Date of Patent: Jul. 13, 2021

(54) IMAGING LENS AND IMAGING APPARATUS

(71) Applicant: FUJIFILM Corporation, Tokyo (JP)

(72) Inventor: Ryoko Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 16/508,128

(22) Filed: Jul. 10, 2019

(65) Prior Publication Data

US 2020/0033562 A1    Jan. 30, 2020

(30) Foreign Application Priority Data

Jul. 26, 2018    (JP) .............................. JP2018-140546

(51) Int. Cl.
| | | |
|---|---|---|
| G02B 13/00 | (2006.01) | |
| G02B 7/04 | (2021.01) | |
| G02B 9/12 | (2006.01) | |
| G02B 13/18 | (2006.01) | |
| G02B 5/00 | (2006.01) | |

(52) U.S. Cl.
CPC ............ *G02B 13/006* (2013.01); *G02B 7/04* (2013.01); *G02B 9/12* (2013.01); *G02B 13/002* (2013.01); *G02B 5/005* (2013.01); *G02B 13/18* (2013.01)

(58) Field of Classification Search
CPC ........ G02B 13/18; G02B 9/12; G02B 13/006; G02B 7/04; G02B 5/005; G02B 13/002
USPC ................................. 359/716, 740, 748, 791
See application file for complete search history.

(56) References Cited

U.S. PATENT DOCUMENTS

| | | | | |
|---|---|---|---|---|
| 5,007,720 A | * | 4/1991 | Hamanishi | G02B 13/02 359/693 |
| 5,272,566 A | * | 12/1993 | Aoki | G02B 15/163 359/686 |
| 5,640,277 A | * | 6/1997 | Ohshita | G02B 13/02 359/684 |
| 6,445,511 B1 | * | 9/2002 | Kitahara | G02B 13/02 359/748 |
| 7,492,524 B2 | * | 2/2009 | Ito | G02B 15/144113 359/683 |
| 7,777,974 B2 | * | 8/2010 | Yamamoto | G02B 27/646 359/791 |

(Continued)

FOREIGN PATENT DOCUMENTS

| | | |
|---|---|---|
| CN | 107390351 A | 11/2017 |
| JP | 2011-112957 A | 6/2011 |

(Continued)

OTHER PUBLICATIONS

An Office Action; "Notice of Reasons for Refusal", mailed by the Japanese Patent Office dated May 11, 2021, which corresponds to Japanese Patent Application No. 2018-140546 and is related to U.S. Appl. No. 16/508,128; with English language translation.

*Primary Examiner* — Evelyn A Lester
(74) *Attorney, Agent, or Firm* — Studebaker & Brackett PC

(57) ABSTRACT

The imaging lens consists of, in order from an object side, a positive first lens group, a positive second lens group, and a negative third lens group. During focusing, only the second lens group moves. The first lens group includes a stop. The second lens group includes one or more cemented lenses in which a negative lens and a positive lens are cemented. The number of the positive lenses included in the second lens group is equal to or greater than three.

19 Claims, 14 Drawing Sheets

EXAMPLE 1

(56) References Cited

U.S. PATENT DOCUMENTS

| | | | | |
|---|---|---|---|---|
| 7,889,432 B2* | 2/2011 | Watanabe | ............... | G02B 21/33 |
| | | | | 359/656 |
| 8,390,943 B2* | 3/2013 | Uemura | ................. | G02B 13/18 |
| | | | | 359/784 |
| 8,587,880 B2* | 11/2013 | Suzuki | ................ | G02B 13/0045 |
| | | | | 359/791 |
| 8,767,319 B2* | 7/2014 | Souma | ............... | G02B 6/03677 |
| | | | | 359/748 |
| 9,746,638 B2* | 8/2017 | Sun | ......................... | G02B 13/16 |
| 2011/0176215 A1* | 7/2011 | Mouri | ..................... | G02B 1/113 |
| | | | | 359/601 |
| 2012/0212842 A1* | 8/2012 | Hosoi | ...................... | G02B 9/12 |
| | | | | 359/784 |
| 2014/0092271 A1* | 4/2014 | Katou | .................... | G02B 13/18 |
| | | | | 359/717 |
| 2014/0139931 A1* | 5/2014 | Kubota | .................... | G02B 9/62 |
| | | | | 359/689 |
| 2014/0313395 A1 | 10/2014 | Lee | | |
| 2014/0368926 A1* | 12/2014 | Suzuki | ................. | G02B 13/006 |
| | | | | 359/708 |
| 2015/0268449 A1* | 9/2015 | Kurioka | ............... | G02B 15/177 |
| | | | | 348/360 |
| 2016/0011404 A1* | 1/2016 | Suzuki | ............... | G02B 27/0025 |
| | | | | 359/708 |
| 2017/0176709 A1* | 6/2017 | Fukuta | ..................... | G02B 7/08 |
| 2018/0372986 A1* | 12/2018 | Maruyama | ................ | G02B 7/14 |
| 2021/0048652 A1* | 2/2021 | Suzuki | ..................... | G02B 9/12 |

FOREIGN PATENT DOCUMENTS

| | | |
|---|---|---|
| JP | 2014-032231 A | 2/2014 |
| JP | 2016-212346 A | 12/2016 |
| JP | 2018-005133 A | 1/2018 |

* cited by examiner

EXAMPLE 1

EXAMPLE 2

EXAMPLE 3

EXAMPLE 4

EXAMPLE 5

EXAMPLE 6

EXAMPLE 2

EXAMPLE 5

IMAGING LENS AND IMAGING APPARATUS

CROSS-REFERENCE TO RELATED APPLICATIONS

The present application claims priority under 35 U.S.C. § 119 to Japanese Patent Application No. 2018-140546, filed on Jul. 26, 2018. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as an imaging lens applicable to an imaging apparatus such as a digital camera, for example, a lens system having a three-group configuration as described in JP2016-212346A or JP2018-005133A is known. JP2016-212346A and JP2018-005133A each describe a lens system which consists of, in order from the object side, a first lens group having a positive refractive power, a second lens group having a positive refractive power and a stop, and a third lens group and in which only the second lens group moves during focusing.

SUMMARY OF THE INVENTION

In recent years, smaller imaging apparatuses have been necessary. In addition, it is also necessary for the imaging apparatus described above to be able to perform autofocus at a high speed.

The lens systems described in JP2016-212346A and JP2018-005133A are configured such that a lens group moving during focusing (hereinafter referred to as a focus group) includes a stop. In an imaging apparatus such as a digital camera, an aperture diameter of a stop is variable, and a stop unit is provided to change the aperture diameter. Therefore, in a configuration in which a lens group including the stop is the focus group, a weight of the group, which includes mechanical parts and is to be moved during focusing, is heavy, and a load on the driving system to drive the group becomes large. Thus, this configuration is disadvantageous for an increase in focusing speed. In addition, the lens systems described in JP2016-212346A and JP2018-005133A each have a disadvantage in that the imaging magnification at the time of imaging the closest object, that is, the maximum imaging magnification is small.

The present disclosure has been made in view of the above circumstances. An object of an embodiment of the present invention is to provide an imaging lens, which is capable of imaging at a larger maximum imaging magnification while maintaining favorable aberration correction and advantageous for downsizing and high-speed focusing, and an imaging apparatus having the imaging lens.

The specific means for achieving the object includes the following aspects.

According to a first aspect, there is provided an imaging lens consisting of, in order from an object side to an image side: a first lens group that has a positive refractive power; a second lens group that has a positive refractive power; and a third lens group that has a negative refractive power. During focusing from an object at infinity to a closest object, the first lens group and the third lens group remain stationary with respect to an image plane, and the second lens group moves along an optical axis. The first lens group includes a stop. In addition, the second lens group includes one or more cemented lenses in which a negative lens and positive lenses are cemented, and the number of the positive lenses included in the second lens group is equal to or greater than three.

According to a second aspect, in the imaging lens according to the first aspect, a lens closest to the image side is a negative lens.

According to a third aspect, in the imaging lens according to the second aspect, assuming that a focal length of the imaging lens during focusing on the object at infinity is f, and a focal length of the negative lens closest to the image side is fR, Conditional Expression (1) is satisfied, which is represented by $$-1.5 < f/fR < -0.02 \qquad (1).$$

According to a fourth aspect, in the imaging lens according to any one of the first to third aspects, assuming that a focal length of the imaging lens during focusing on the object at infinity is f, and a focal length of the first lens group is f1, Conditional Expression (2) is satisfied, which is represented by $$0.005 < f/f1 < 0.5 \qquad (2).$$

According to a fifth aspect, in the imaging lens according to any one of the first to fourth aspects, assuming that a focal length of the imaging lens during focusing on the object at infinity is f, and a focal length of the third lens group is f3, Conditional Expression (3) is satisfied, which is represented by $$-0.5 < f/f3 < 0 \qquad (3).$$

According to a sixth aspect, in the imaging lens according to any one of the first to fifth aspects, a lens closest to the object side is a positive lens.

According to a seventh aspect, in the imaging lens according to sixth aspect, a lens which is the second from the object side is a positive lens.

According to an eighth aspect, in the imaging lens according to any one of the first to seventh aspects, a lens surface closest to the image side in the first lens group is a concave surface.

According to a ninth aspect, in the imaging lens according to any one of the first to eighth aspects, assuming that an Abbe number of the positive lens of the first lens group based on a d line is v1, the first lens group includes a positive lens which satisfies Conditional Expression (4) represented by $$70 < v1 < 110 \qquad (4).$$

According to a tenth aspect, in the imaging lens according to any one of the first to ninth aspects, assuming that an Abbe number of the positive lens of the second lens group based on a d line is v2, the second lens group includes a positive lens which satisfies Conditional Expression (5) represented by $$65 < v2 < 110 \qquad (5).$$

According to an eleventh aspect, in the imaging lens according to any one of the first to tenth aspects, assuming that a focal length of the imaging lens during focusing on the object at infinity is f, and a focal length of the second lens group is f2, Conditional Expression (6) is satisfied, which is represented by $$1<f/f2<2 \qquad (6).$$

According to a twelfth aspect, in the imaging lens according to any one of the first to eleventh aspects, at least one of the cemented lenses in the second lens group is formed by cementing a negative lens having a concave surface on the object side and a positive lens having a convex surface on the image side in order from the object side.

According to a thirteenth aspect, in the imaging lens according to any one of the first to twelfth aspects, a lens surface closest to the image side is a concave surface.

According to a fourteenth aspect, in the imaging lens according to any one of the first to thirteenth aspects, assuming that a focal length of the second lens group is f2, and a focal length of the third lens group is f3, Conditional Expression (7) is satisfied, which is represented by $$0.01<|f2/f3|<0.35 \qquad (7).$$

According to a fifteenth aspect, in the imaging lens according to the third aspect, Conditional Expression (1-1) is satisfied, which is represented by $$-1<f/fR<-0.02 \qquad (1-1).$$

According to a sixteenth aspect, in the imaging lens according to the fourth aspect, Conditional Expression (2-1) is satisfied, which is represented by $$0.01<f/f1<0.3 \qquad (2-1).$$

According to a seventeenth aspect, in the imaging lens according to the fifth aspect, Conditional Expression (3-1) is satisfied, which is represented by $$-0.45<f/f3<0 \qquad (3-1).$$

According to an eighteenth aspect, in the imaging lens according to any one of the first to seventeenth aspects, the second lens group consists of, in order from the object side to the image side, a positive lens, a first cemented lens, a second cemented lens, and one or more positive lenses. The first cemented lens is formed by cementing a positive lens and a negative lens in order from the object side. In addition, it is preferable that the second cemented lens is formed by cementing a negative lens and a positive lens in order from the object side.

According to a nineteenth, in the imaging lens according to any one of the first to seventeenth aspects, the second lens group consists of, in order from the object side to the image side, an aspheric lens, two cemented lenses, and a positive lens. In addition, it is preferable that each of the two cemented lenses is formed by cementing a negative lens and a positive lens in order from the object side.

According to a twentieth aspect, there is provided an imaging apparatus comprising the imaging lens according to any one of the first to nineteenth aspects.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the term "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "lens group" is not limited to a configuration using a plurality of lenses, but may consist of only one lens.

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in a conditional expression is a paraxial focal length. The values used in Conditional Expressions are values based on the d line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to an embodiment of the present invention, it is possible to provide an imaging lens, which is capable of imaging at a larger maximum imaging magnification while maintaining favorable aberration correction and advantageous for downsizing and high-speed focusing, and an imaging apparatus having the imaging lens.

DESCRIPTION OF THE PREFERRED EMBODIMENTS

Figure 1:
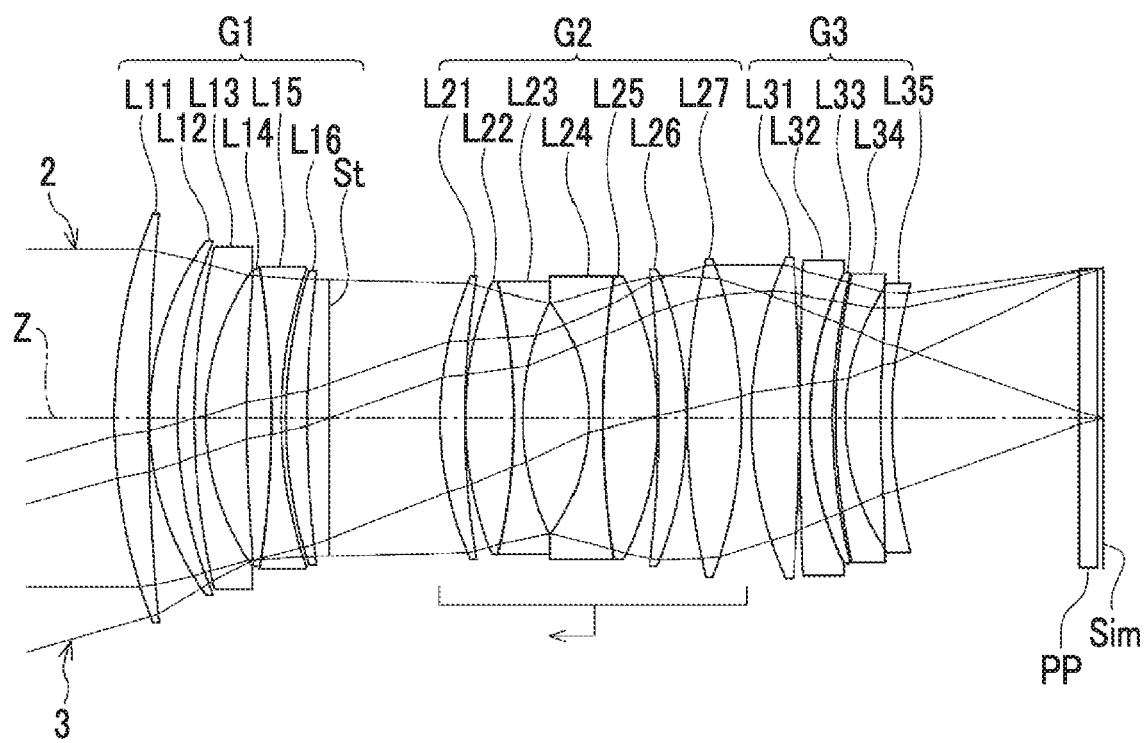
FIG. 1 is a cross-sectional view illustrating a configuration of an imaging lens (imaging lens of Example 1 of the present invention) according to an embodiment of the present invention.

Hereinafter, embodiments of the imaging lens of the present disclosure will be described in detail with reference to the drawings. FIG. 1 is a cross-sectional view illustrating a configuration of an imaging lens according to an embodiment of the present invention. The example shown in FIG. 1 corresponds to the imaging lens of Example 1 to be described later. In FIG. 1, the left side is the object side, the right side is the image side, and a state in which an object at infinity is in focus is shown. Further, FIG. 1 also shows on-axis rays 2 and rays with a maximum angle of view 3 as rays.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of, in order from the object side to the image side along the optical axis Z: a first lens group G1 that has a positive refractive power; a second lens group G2 that has a positive refractive power; and a third lens group G3 that has a negative refractive power. Since the imaging lens includes not only the lens groups having positive refractive powers but also the lens group having a negative refractive power, it becomes easy to correct chromatic aberration. In addition, since the lens group closest to the image side has a negative refractive power, it becomes easy to emit off-axis rays incident on the image plane Sim from the lens closest to the image side in a direction away from the optical axis Z. As a result, the diameter of the lens closest to the image side is reduced, and it is possible to prevent the off-axis rays from being blocked by the mount used in a case of mounting the imaging lens onto the imaging apparatus.

In the imaging lens of the present disclosure, an aperture stop St is configured to be included in the first lens group G1. As an example, in the imaging lens shown in FIG. 1, the first lens group G1 consists of six lenses L11 to L16 and the aperture stop St in order from the object side to the image side, the second lens group G2 consists of seven lenses L21 to L27 in order from the object side to the image side, and the third lens group G3 consists of five lenses L31 to L35 in order from the object side to the image side. However, as shown in an embodiment described later, it is possible to make the number of lenses constituting each lens group different from the number thereof in the example shown in FIG. 1. It should be noted that the aperture stop St shown in FIG. 1 indicates a position on the optical axis Z.

The imaging lens is configured such that, during focusing from an object at infinity to a closest object, the first lens group G1 and the third lens group G3 remain stationary with respect to the image plane Sim, and the second lens group G2 is moved along the optical axis Z. In the example shown in FIG. 1, the second lens group G2 moves to the object side during focusing from the object at infinity to the closest object. The arrow pointing to the left under the second lens group G2 shown in FIG. 1 means that the second lens group G2 is a focus group that moves to the object side during focusing from the object at infinity to the closest object.

By adopting a configuration in which the first lens group G1 remains stationary during focusing, the total length of the lens system becomes constant during focusing. Thus, concerns about interference with the subject at the time of imaging can be reduced. Further, by adopting a configuration in which the third lens group G3 remains stationary during focusing, it is possible to suppress fluctuation in field curvature during focusing, and it is possible to prevent the dust from entering the inside of the lens barrel.

By setting the second lens group G2 not including the aperture stop St as the focus group, a weight of a group, which includes mechanical parts and is to be moved during focusing, can be reduced, and the load on the driving system for driving this group can be reduced. Thus, there are advantages in achieving reduction in size of the lens and increasing the focusing speed.

Further, by adopting a configuration in which the third lens group G3 does not include the aperture stop St, it is possible to suppress an increase in the lens outer diameter of the first lens group G1. Thus, the enlargement of the entire lens system can be suppressed.

The aperture stop St can be configured to be disposed to be closest to the image side in the first lens group G1. In such a case, by disposing the aperture stop St just in front of the object side of the focus group, the height of the light beam incident on the focus group can be suppressed. Thus, the diameter of the lens of the focus group can be reduced. As a result, there are advantages in reducing the load on the driving system that drives the focus group and in increasing the focusing speed.

It is preferable that the lens closest to the object side in the first lens group G1 is a positive lens. In such a case, the total length of the lens system can be shortened, and spherical aberration can be easily reduced. Further, it is preferable that a lens which is the second from the object side in the first lens group G1 is a positive lens. In such a case, since two positive lenses are arranged successively from the object side, the total length of the lens system can be further shortened, and reduction of spherical aberration is further easily achieved.

It is preferable that the lens surface closest to the image side in the first lens group G1 is a concave surface. In such a case, coma aberration can be reduced.

As an example, it is possible to adopt a configuration in which the number of lenses included in the first lens group G1 is five or six. The lenses of the first lens group G1 can be configured to be four positive lenses and two negative lenses. Alternatively, the lenses of the first lens group G1 can be configured to be three positive lenses and two negative lenses. As an example, the first lens group G1 can be configured to consist of, in order from the object side to the image side, two positive lenses, a negative lens, a positive lens, a negative lens, a positive lens, and an aperture stop St. Alternatively, the first lens group G1 can be configured to consist of, in order from the object side to the image side, three positive lenses, two negative lenses, and an aperture stop St. It is preferable that the first lens group G1 includes a cemented lens in which a negative lens and a positive lens are cemented in order to satisfactorily correct chromatic aberration.

The second lens group G2 is configured to include one or more cemented lenses in which at least one positive lens and at least one negative lens are cemented. Since the focus group includes the cemented lens, it is possible to suppress fluctuation in chromatic aberration due to change in imaging distance even in a case where the optical system has a small F number. In addition, it is possible to perform imaging at a larger maximum imaging magnification while maintaining favorable aberration correction.

It is preferable that at least one of the cemented lenses in the second lens group G2 is a cemented lens formed by cementing a negative lens having a concave surface on the object side and a positive lens having a convex surface on the image side in order from the object side. In such a case, chromatic aberration can be reduced.

The number of positive lenses included in the second lens group G2 is three or more. With such a configuration, the positive refractive power of the second lens group G2 can be shared by three or more positive lenses. Thus, it becomes easy to correct spherical aberration, and an optical system having a small F number and favorable performance can be realized.

As an example, the second lens group G2 can be configured to consist of seven lenses. For example, the second lens group G2 can be configured to consist of, in order from the object side to the image side, a positive lens, a first cemented lens, a second cemented lens, and one or more positive lenses. The first cemented lens is formed by cementing a positive lens and a negative lens in order from the object side, and the second cemented lens is formed by cementing a negative lens and a positive lens in order from the object side. In such a case, the aberration occurring in the second lens group G2 can be suppressed, and the aberration fluctuation during focusing can be reduced.

Alternatively, the second lens group G2 can be configured to consist of six lenses. For example, the second lens group G2 can be configured to consist of, in order from the object side to the image side, an aspheric lens, two cemented lenses, and a positive lens. Both of the two cemented lenses are formed by cementing a negative lens and a positive lens in order from the object side. In such a case, spherical aberration can be satisfactorily corrected even in an optical system having a small F number.

It is preferable that the lens closest to the image side in the third lens group G3 is a negative lens. In such a case, off-axis rays, which are incident onto the image plane Sim from the lens closest to the image side, can be emitted in the direction away from the optical axis Z. As a result, the diameter of the lens closest to the image side is reduced, and it is possible to prevent the off-axis rays from being blocked by the mount used in a case of mounting the imaging lens onto the imaging apparatus.

It is preferable that the lens surface closest to the image side in the third lens group G3 is a concave surface. In such a case, as in the case where the lens closest to the image side in the third lens group G3 described above is a negative lens, light blocking caused by the mount is avoided. As a result, there is an advantage in reducing the diameter of the lens closest to the image side.

As an example, the third lens group G3 can be configured to consist of five or six lenses. For example, the third lens group G3 can be configured to consist of, in order from the object side to the image side, a positive lens, a negative lens, a positive lens, a negative lens, and a negative lens. Alternatively, the third lens group G3 can be configured to consist of, in order from the object side to the image side, a positive lens, a negative lens, a positive lens, a negative lens, a positive lens, and a negative lens. It is preferable that the third lens group G3 includes a cemented lens in which a negative lens and a positive lens are cemented in order to satisfactorily correct chromatic aberration.

Next, a configuration relating to the conditional expressions will be described. In a case where the lens closest to the image side is a negative lens, assuming that a focal length of the imaging lens during focusing on the object at infinity is f, and a focal length of the negative lens closest to the image side is fR, it is preferable to satisfy Conditional Expression (1). By not allowing the result of Conditional Expression (1) to be equal to or less than the lower limit, there is an advantage in correcting distortion. By not allowing the result of Conditional Expression (1) to be equal to or greater than the upper limit, it is possible to ensure the negative refractive power of the lens closest to the image side, and to suppress the increase in diameter of the lens closest to the image side. In a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$-1.5 < f/fR < -0.02 \tag{1}$$

$$-1 < f/fR < -0.02 \tag{1-1}$$

$$-0.8 < f/fR < -0.02 \tag{1-2}$$

Assuming that a focal length of the imaging lens during focusing on the object at infinity is f, and a focal length of the first lens group G1 is f1, it is preferable to satisfy Conditional Expression (2). By not allowing the result of Conditional Expression (2) to be equal to or less than the lower limit, the refractive power of the first lens group G1 can be ensured, and there is an advantage in shortening the total length of the lens system. By not allowing the result of Conditional Expression (2) to be equal to or greater than the upper limit, the refractive power of the first lens group G1 is prevented from becoming excessively strong. Thus, it becomes easy to correct spherical aberration. In a case of a configuration in which Conditional Expression (2-1) is satisfied, it is possible to obtain more favorable characteristics.

$$0.005 < f/f1 < 0.5 \tag{2}$$

$$0.01 < f/f1 < 0.3 \tag{2-1}$$

Assuming that a focal length of the imaging lens during focusing on the object at infinity is f, and a focal length of the third lens group G3 is f3, it is preferable to satisfy Conditional Expression (3). By not allowing the result of Conditional Expression (3) to be equal to or less than the lower limit, the refractive power of the third lens group G3 is prevented from becoming excessively strong. Thus, the amount of aberration occurring in the third lens group G3 can be suppressed. In a case of a configuration in which Conditional Expression (3-1) is satisfied, it is possible to obtain more favorable characteristics.

$$-0.5 < f/f3 < 0 \tag{3}$$

$$-0.45 < f/f3 < 0 \tag{3-1}$$

Assuming that an Abbe number of the positive lens of the first lens group G1 at a d line is ν1, the first lens group G1 includes at least one positive lens which satisfies Conditional Expression (4). In such a case, chromatic aberration can be reduced.

$$70 < v1 < 110 \tag{4}$$

Assuming that an Abbe number of the positive lens of the second lens group G2 at a d line is v2, the second lens group G2 includes at least one positive lens which satisfies Conditional Expression (5). In such a case, chromatic aberration can be reduced.

$$65 < v2 < 110 \tag{5}$$

Assuming that a focal length of the imaging lens during focusing on the object at infinity is f, and a focal length of the second lens group G2 is f2, it is preferable to satisfy Conditional Expression (6). By not allowing the result of Conditional Expression (6) to be equal to or less than the lower limit, the refractive power of the second lens group G2 can be ensured, and the amount of movement of the focus group can be suppressed. As a result, there is an advantage in shortening the total length of the lens system. By not allowing the result of Conditional Expression (6) to be equal to or greater than the upper limit, the refractive power of the second lens group G2 is prevented from becoming excessively strong. Thus, it is possible to suppress the aberration fluctuation during focusing. In a case of a configuration in which Conditional Expression (6-1) is satisfied, it is possible to obtain more favorable characteristics.

$$1 < f/f2 < 2 \tag{6}$$

$$1 < f/f2 < 1.5 \tag{6-1}$$

Assuming that a focal length of the second lens group G2 is f2, and a focal length of the third lens group G3 is f3, it is preferable to satisfy Conditional Expression (7). By not allowing the result of Conditional Expression (7) to be equal to or less than the lower limit, the refractive power of the second lens group G2 is prevented from becoming excessively strong. Thus, it is possible to suppress the aberration fluctuation during focusing. By not allowing the result of Conditional Expression (6) to be equal to or greater than the upper limit, the refractive power of the second lens group G2 can be ensured, and the amount of movement of the focus group can be suppressed. As a result, there is an advantage in shortening the total length of the lens system. In a case of a configuration in which Conditional Expression (7-1) is satisfied, it is possible to obtain more favorable characteristics.

$$0.01 < |f2/f3| < 0.35 \tag{7}$$

$$0.01 < |f2/f3| < 0.31 \tag{7-1}$$

The above-mentioned preferred configurations and available configurations may be optional combinations, and it is preferable to selectively adopt the configurations in accordance with a required specification. According to the technology of the present disclosure, it is possible to realize an imaging lens which is capable of imaging at a larger maximum imaging magnification while maintaining favorable aberration correction, has a small F number, and is advantageous for downsizing and high-speed focusing. The term "larger maximum imaging magnification" described herein means that the absolute value of the maximum imaging magnification is greater than 0.15. Further, the term "small F number" described herein means an F number less than 1.4.

Next, numerical examples of the imaging lens of the present invention will be described.

Example 1

FIG. 1 shows a cross-sectional view illustrating the configuration of the imaging lens of Example 1, and the illustration method and the configuration thereof are as described above. Therefore, the repeated description is partially omitted here. The imaging lens of Example 1 consists of, in order from the object side to the image side: a first lens group G1 that has a positive refractive power; a second lens group G2 that has a positive refractive power; and a third lens group G3 that has a negative refractive power. During focusing from the object at infinity to the closest object, only the second lens group G2 moves to the object side along the optical axis Z. The outline of the imaging lens of Example 1 has been described above.

The first lens group G1 consists of, in order from the object side to the image side, six lenses L11 to L16 and an aperture stop St. The second lens group G2 consists of seven lenses L21 to L27 in order from the object side to the image side. The third lens group G3 consists of five lenses L31 to L35 in order from the object side to the image side.

Table 1 shows basic lens data of the imaging lens of Example 1, Table 2 shows a specification and variable surface distances, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the respective components at the d line, and the column of vd shows Abbe numbers of the respective components based on the d line.

In Table 1, the sign of the radius of curvature of the surface convex toward the object side is positive and the sign of the radius of curvature of the surface convex toward the image side is negative. Table 1 also shows the aperture stop St, and in the column of the surface number of the surface corresponding to the aperture stop St, the surface number and (St) are noted. A value at the bottom place of D in Table 1 indicates a distance between the image plane Sim and the surface closest to the image side in the table. In Table 1, the variable surface distances, which are distances variable during focusing, are referenced by the reference signs DD[ ], and are noted in places of D, where object side surface numbers of distances are noted in [ ].

Table 2 shows the focal length f of the imaging lens in a state where the object at infinity is in focus, a focal length fnear of the imaging lens in a state where the closest object is in focus, and an absolute value |β| of the maximum imaging magnification. In Table 2, the object distance of the closest object is noted in the right column in which the infinity is noted, and the object distance of the closest object of Example 1 is 0.524 m (meters). Further, Table 2 shows the F number FNo., the maximum total angle of view 2ω, and the variable surface distance in a state in which the object at infinity is in focus and a state in which the closest object is in focus. (°) in the place of 2ω indicates that the unit thereof is a degree. Table 2 shows the values based on the d line.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . ) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd |
|---|---|---|---|---|
| 1 | 105.5121 | 6.07 | 2.00272 | 19.32 |
| 2 | 366.2734 | 0.15 | | |
| 3 | 56.9581 | 5.02 | 1.49700 | 81.54 |
| 4 | 85.1608 | 3.01 | | |
| 5 | 139.1324 | 2.00 | 1.62588 | 35.70 |
| 6 | 48.2057 | 7.30 | | |
| 7 | 300.1002 | 4.42 | 1.87070 | 40.73 |
| 8 | −178.4202 | 1.70 | 1.89286 | 20.36 |
| 9 | 83.8883 | 0.85 | | |
| 10 | 89.1431 | 3.80 | 1.90366 | 31.31 |
| 11 | 215.0735 | 4.00 | | |
| 12(St) | ∞ | DD[12] | | |
| 13 | 64.5283 | 4.35 | 2.00272 | 19.32 |
| 14 | 157.7263 | 0.15 | | |
| 15 | 68.5197 | 8.61 | 1.49700 | 81.54 |
| 16 | −108.3719 | 1.58 | 1.74077 | 27.79 |
| 17 | 50.0387 | 11.61 | | |
| 18 | −36.5058 | 2.47 | 1.80518 | 25.42 |
| 19 | 172.0887 | 9.78 | 1.65160 | 58.55 |
| 20 | −57.2894 | 0.15 | | |
| 21 | −222.3325 | 4.93 | 1.95906 | 17.47 |
| 22 | −72.2361 | 0.15 | | |
| 23 | 127.8942 | 9.67 | 1.49700 | 81.54 |
| 24 | −84.2783 | DD[24] | | |
| 25 | 72.5446 | 8.68 | 1.81600 | 46.62 |
| 26 | −381.6845 | 0.10 | | |
| 27 | 736.9216 | 1.85 | 1.67300 | 38.26 |
| 28 | 61.3530 | 3.99 | 2.00100 | 29.13 |
| 29 | 112.7966 | 0.56 | | |
| 30 | 120.9918 | 1.66 | 1.69895 | 30.13 |
| 31 | 43.6313 | 6.35 | | |
| *32 | 172.7774 | 2.00 | 1.80139 | 45.45 |
| *33 | 86.4861 | 33.29 | | |
| 34 | ∞ | 3.30 | 1.51680 | 64.20 |
| 35 | ∞ | 1.00 | | |

TABLE 2

Example 1

| | at infinity | 0.524 m |
|---|---|---|
| f | 88.78 | — |
| fnear | — | 84.56 |
| \|β\| | — | 0.17 |
| FNo. | 1.44 | 1.71 |
| 2ω(°) | 32.8 | 30.4 |
| DD[12] | 19.85 | 1.26 |
| DD[24] | 1.75 | 20.34 |

TABLE 3

Example 1

| Sn | 32 | 33 |
|---|---|---|
| KA | 1.0000000E+00 | 1.0000000E+00 |
| A3 | 0.0000000E+00 | 0.0000000E+00 |
| A4 | −3.0390996E−06 | −5.6923108E−07 |
| A5 | 8.5559839E−09 | −4.7171599E−08 |
| A6 | −8.9853874E−10 | 2.0893634E−09 |
| A7 | 5.0779792E−12 | 8.6887734E−12 |
| A8 | 5.6600127E−13 | −6.8621242E−13 |
| A9 | 8.0666908E−15 | −1.0386680E−14 |
| A10 | −1.6466657E−16 | 3.7514096E−16 |
| A11 | −9.2023746E−18 | 2.5176536E−17 |
| A12 | −4.8010897E−20 | 7.2652834E−19 |
| A13 | 1.2851357E−20 | 7.6996358E−21 |
| A14 | 7.8463379E−22 | −3.1223701E−22 |
| A15 | 2.4756320E−23 | −1.6889951E−23 |
| A16 | 2.2035968E−25 | −1.6232796E−25 |
| A17 | −2.7237162E−26 | 2.3426080E−26 |
| A18 | −1.9786792E−27 | 1.4923925E−27 |
| A19 | −6.2035578E−29 | 1.1108692E−29 |
| A20 | 1.3918273E−30 | −5.9644862E−30 |

Figure 7:
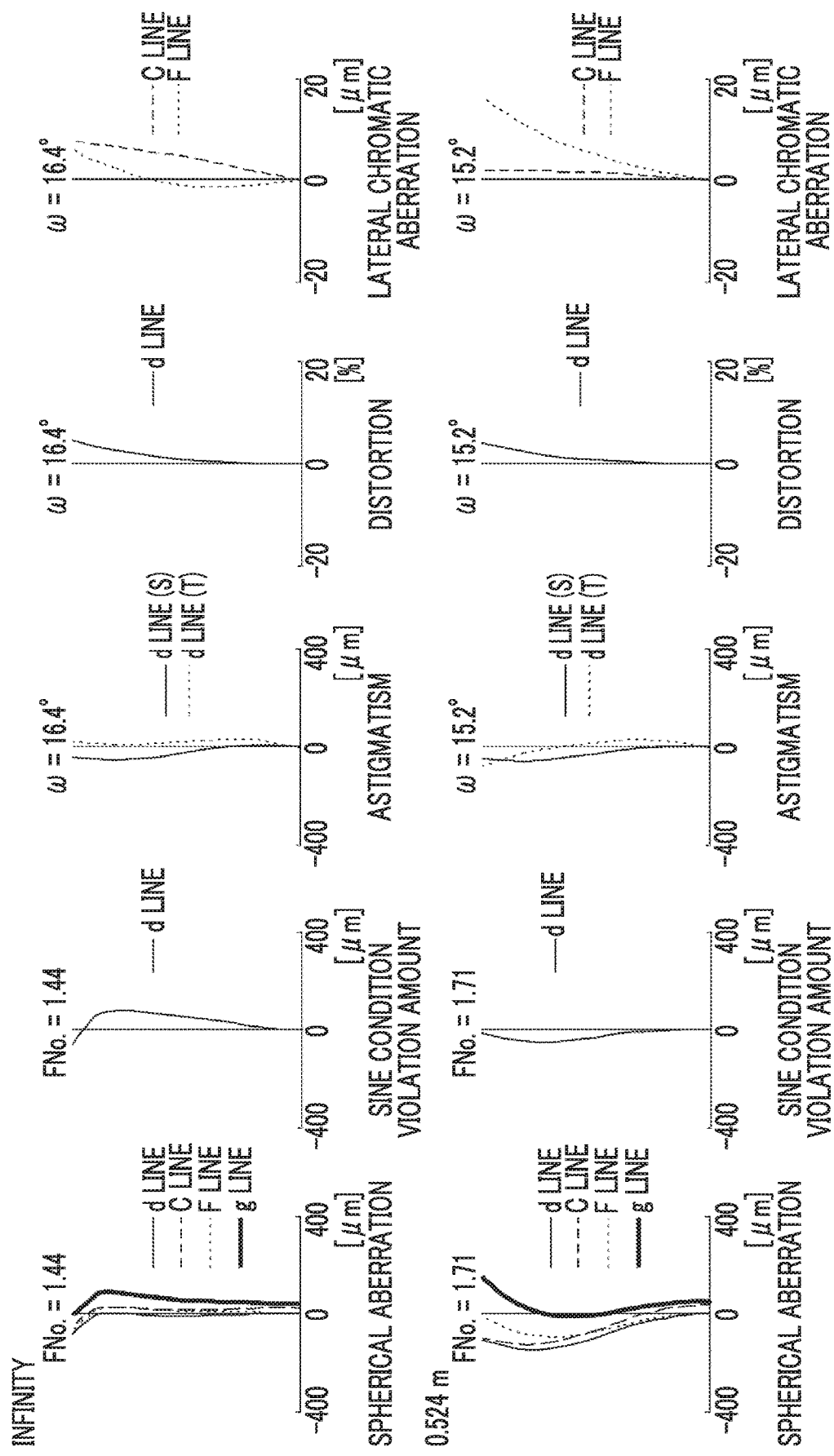
FIG. 7 is a diagram of aberrations of the imaging lens of Example 1 of the present invention.

FIG. 7 shows a diagram of aberrations of the imaging lens of Example 1. FIG. 7 shows spherical aberrations, amounts of sine condition violation, astigmatisms, distortions, and lateral chromatic aberrations are shown in order from the left side. In FIG. 7, aberration diagrams in a state where an object at infinity is in focus are shown in the upper part labeled as "infinity", and aberration diagrams in a state where an object having an object distance of "0.524 m" is in focus are shown in the lower part labeled as "0.524 m (meters)". In the spherical aberration diagram, aberrations at the d line, the C line, the F line, and the g line are respectively indicated by the solid line, the long dashed line, the short dashed line, and the heavy line. In the diagram of the sine condition violation amount, the aberration at the d line is indicated by the solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram and the diagram of the sine condition violation amount, FNo. indicates an F number. In the other aberration diagrams, w indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 2:
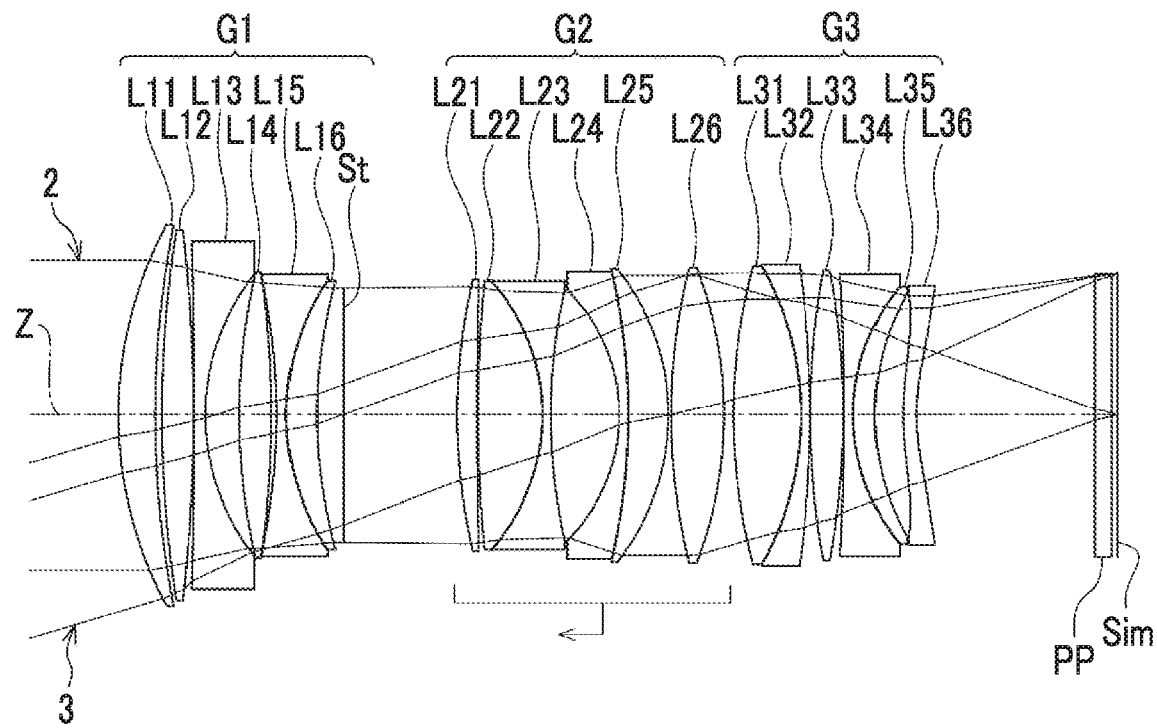
FIG. 2 is a cross-sectional view illustrating a configuration of an imaging lens of Example 2 of the present invention.
Figure 8:
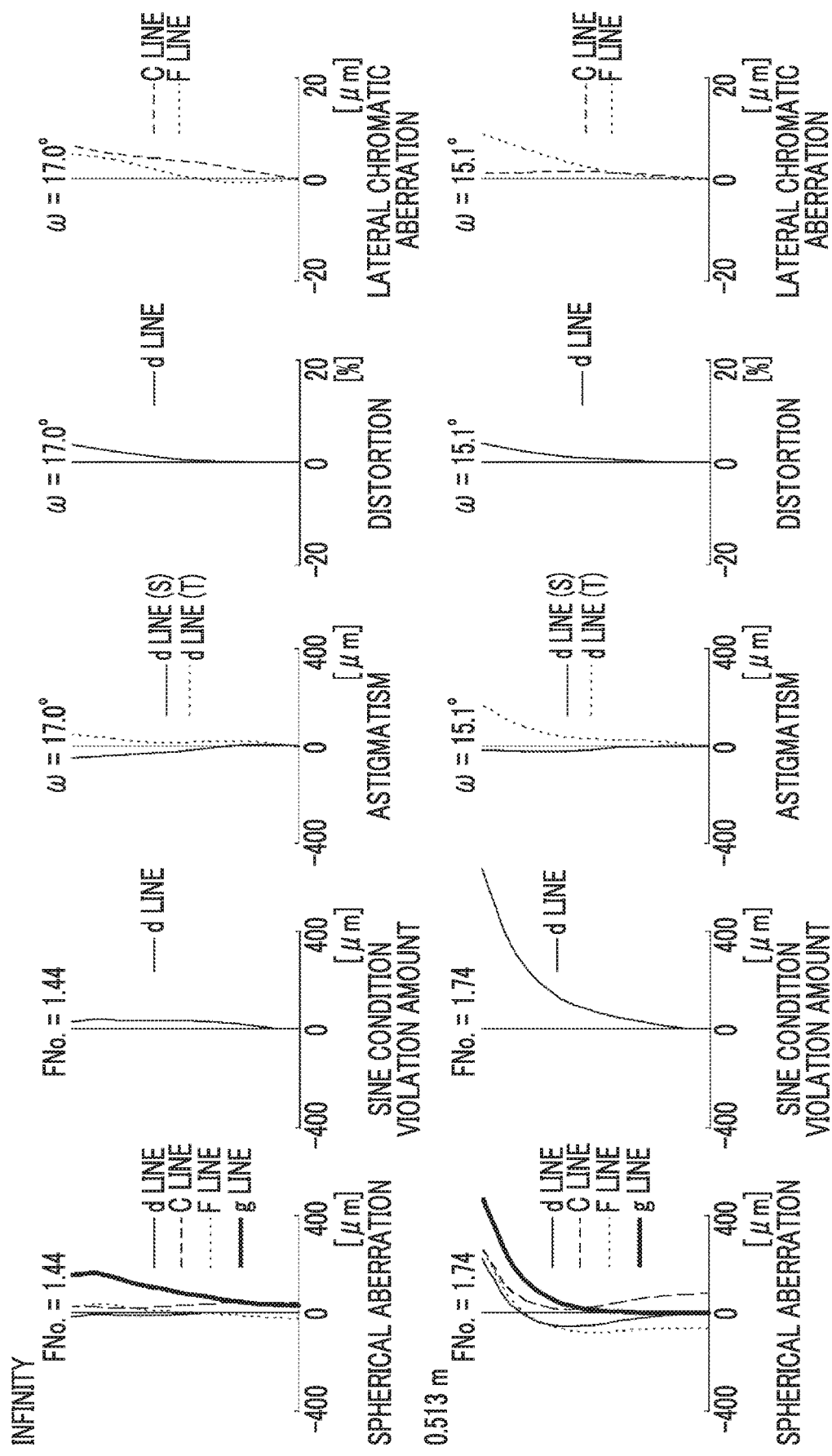
FIG. 8 is a diagram of aberrations of the imaging lens of Example 2 of the present invention.

FIG. 2 is a cross-sectional view illustrating a configuration of the imaging lens of Example 2. The imaging lens of Example 2 has the same configuration as the outline of the imaging lens of Example 1. The first lens group G1 includes, in order from the object side to the image side, six lenses L11 to L16 and an aperture stop St. The second lens group G2 consists of, in order from the object side to the image side, six lenses L21 to L26. The third lens group G3 consists of, in order from the object side to the image side, six lenses L31 to L36. Table 4 shows basic lens data of the imaging lens of Example 2, Table 5 shows a specification and variable surface distances, Table 6 shows aspheric surface coefficients, and FIG. 8 shows aberration diagrams. In FIG. 8, aberration diagrams in a state in which an object at infinity is in focus are shown in the upper part, and aberration diagrams in a state in which the object at the object distance of 0.513 m (meters) is in focus are in the lower part.

TABLE 4

Example 2

| Sn | R | D | Nd | vd |
|---|---|---|---|---|
| 1 | 79.7794 | 6.84 | 2.00069 | 25.46 |
| 2 | 194.7827 | 1.27 | | |
| 3 | 232.9476 | 5.96 | 1.49700 | 81.54 |
| 4 | −312.7082 | 0.15 | | |
| 5 | −1135.7417 | 2.02 | 1.53172 | 48.84 |
| 6 | 44.9983 | 6.37 | | |
| 7 | 127.2853 | 5.97 | 1.90043 | 37.37 |
| 8 | −207.8610 | 0.97 | | |
| 9 | −128.4314 | 1.79 | 1.74077 | 27.79 |
| 10 | 48.2624 | 5.64 | 1.88300 | 40.76 |
| 11 | 97.8177 | 5.00 | | |
| 12(St) | ∞ | DD[12] | | |
| 13 | 118.3884 | 3.78 | 2.00069 | 25.46 |
| 14 | 1218.4458 | 0.15 | | |
| 15 | 284.8631 | 12.03 | 1.49700 | 81.54 |
| 16 | −39.9779 | 1.57 | 1.69895 | 30.13 |
| 17 | 113.5527 | 12.82 | | |
| 18 | −34.9997 | 1.69 | 1.51742 | 52.43 |
| 19 | −124.7515 | 7.50 | 1.90043 | 37.37 |
| 20 | −46.7505 | 0.50 | | |
| 21 | 122.4916 | 9.91 | 1.49700 | 81.54 |
| 22 | −81.8724 | DD[22] | | |
| 23 | 114.9877 | 12.68 | 1.49700 | 81.54 |
| 24 | −59.9139 | 1.75 | 1.76182 | 26.52 |
| 25 | −209.8556 | 0.10 | | |
| 26 | 160.4854 | 6.18 | 2.00272 | 19.32 |
| 27 | −155.3790 | 0.15 | | |
| 28 | −494.9657 | 1.66 | 1.67270 | 32.10 |
| 29 | 39.9962 | 4.01 | 1.78800 | 47.37 |
| 30 | 48.9622 | 5.21 | | |
| *31 | 55.6542 | 2.50 | 1.80139 | 45.45 |
| *32 | 42.8641 | 33.37 | | |
| 33 | ∞ | 3.20 | 1.51680 | 64.20 |
| 34 | ∞ | 1.00 | | |

TABLE 5

Example 2

| | Infinity | 0.513 m |
|---|---|---|
| f | 86.20 | — |
| fnear | — | 85.00 |
| \|β\| | — | 0.18 |
| FNo. | 1.44 | 1.74 |
| 2ω(°) | 34.0 | 30.2 |
| DD[12] | 21.39 | 0.90 |
| DD[22] | 1.75 | 22.24 |

TABLE 6

Example 2

| Sn | 31 | 32 |
|---|---|---|
| KA | 1.0000000E+00 | 1.0000000E+00 |
| A3 | 0.0000000E+00 | 0.0000000E+00 |
| A4 | −1.7005325E−05 | −1.6530846E−05 |
| A5 | −3.4205951E−08 | −1.1980404E−07 |
| A6 | 2.2271113E−09 | 9.5208632E−09 |
| A7 | 2.1731201E−10 | 1.8365831E−10 |
| A8 | 5.6710648E−12 | 1.9801103E−12 |
| A9 | 3.4764702E−14 | 3.7272929E−15 |
| A10 | −3.4782158E−15 | −1.8489128E−15 |
| A11 | −1.9117822E−16 | −1.2011312E−16 |
| A12 | −6.0373860E−18 | −5.1845529E−18 |
| A13 | −1.0223829E−19 | −1.5884655E−19 |
| A14 | 1.2480307E−21 | −2.4721467E−21 |
| A15 | 1.9081074E−22 | 9.1781182E−23 |
| A16 | 9.5601868E−24 | 1.0295040E−23 |
| A17 | 3.1520699E−25 | 5.4521815E−25 |
| A18 | 5.2728785E−27 | 1.7495610E−26 |
| A19 | −2.0522128E−28 | −8.4255795E−29 |
| A20 | −2.5151423E−29 | −4.7008883E−29 |

Example 3

Figure 3:
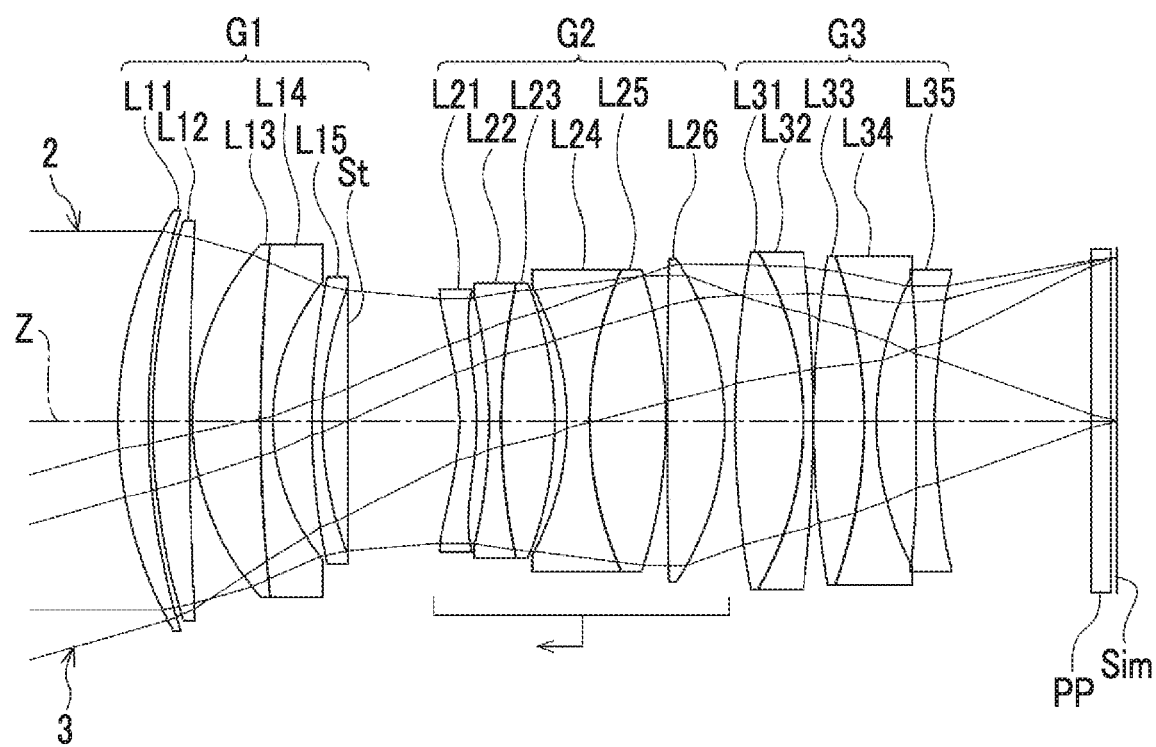
FIG. 3 is a cross-sectional view illustrating a configuration of an imaging lens of Example 3 of the present invention.
Figure 9:
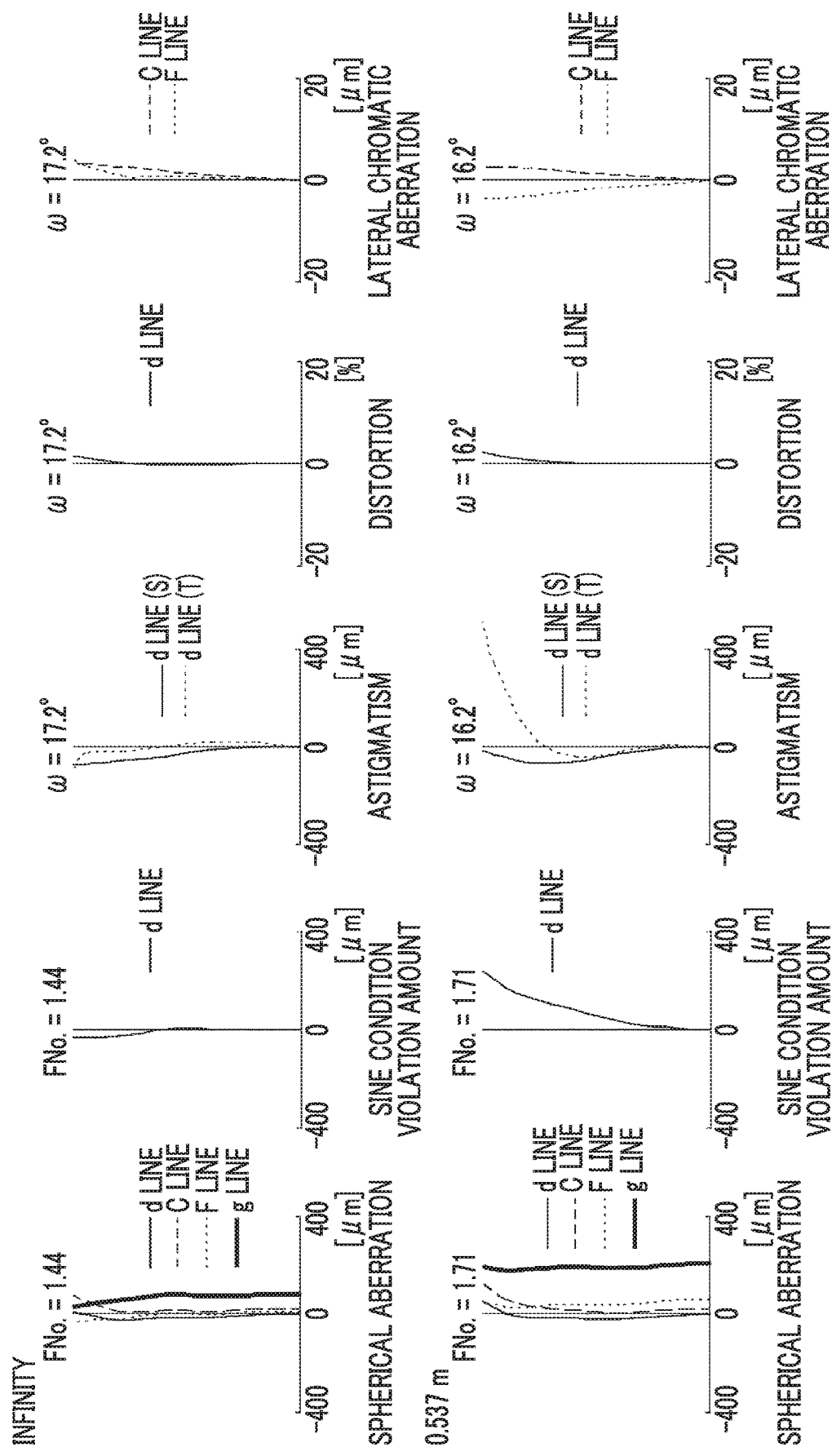
FIG. 9 is a diagram of aberrations of the imaging lens of Example 3 of the present invention.

FIG. 3 is a cross-sectional view illustrating a configuration of the imaging lens of Example 3. The imaging lens of Example 3 has the same configuration as the outline of the imaging lens of Example 1. The first lens group G1 includes, in order from the object side to the image side, five lenses L11 to L15 and an aperture stop St. The second lens group G2 consists of, in order from the object side to the image side, six lenses L21 to L26. The third lens group G3 consists of, in order from the object side to the image side, five lenses L31 to L35. Table 7 shows basic lens data of the imaging lens of Example 3, Table 8 shows a specification and variable surface distances, Table 9 shows aspheric surface coefficients, and FIG. 9 shows aberration diagrams. In FIG. 9, aberration diagrams in a state in which an object at infinity is in focus are shown in the upper part, and aberration diagrams in a state in which the object at the object distance of 0.537 m (meters) is in focus are in the lower part.

TABLE 7

Example 3

| Sn | R | D | Nd | vd |
|---|---|---|---|---|
| 1 | 73.4427 | 4.90 | 1.95906 | 17.47 |
| 2 | 120.7839 | 0.72 | | |
| 3 | 114.7808 | 6.00 | 1.43875 | 94.66 |
| 4 | 635.1184 | 0.50 | | |
| 5 | 44.8054 | 11.02 | 1.67790 | 55.34 |
| 6 | 263.6156 | 2.06 | 1.80518 | 25.42 |
| 7 | 37.4765 | 6.33 | | |
| 8 | 114.1259 | 1.71 | 1.84666 | 23.78 |
| 9 | 62.3920 | 4.14 | | |
| 10(St) | ∞ | DD[10] | | |
| *11 | −43.3295 | 2.80 | 1.58313 | 59.38 |
| *12 | −55.7487 | 2.00 | | |
| 13 | −93.1619 | 2.01 | 1.51742 | 52.43 |
| 14 | 111.0653 | 8.70 | 1.75500 | 52.32 |
| 15 | −62.6414 | 2.00 | | |
| 16 | −47.1975 | 3.52 | 1.58144 | 40.75 |
| 17 | 63.7514 | 12.41 | 1.60311 | 60.64 |
| 18 | −83.8924 | 0.30 | | |
| 19 | 1462.5812 | 9.32 | 1.59522 | 67.73 |
| 20 | −50.1714 | DD[20] | | |
| 21 | 155.9971 | 11.13 | 1.61800 | 63.33 |
| 22 | −57.5258 | 1.71 | 1.72825 | 28.46 |
| 23 | −246.6476 | 0.10 | | |

TABLE 7-continued

Example 3

| Sn | R | D | Nd | vd |
|---|---|---|---|---|
| 24 | 164.3402 | 8.23 | 2.00272 | 19.32 |
| 25 | −82.5034 | 2.01 | 1.74950 | 35.33 |
| 26 | 53.9988 | 6.44 | | |
| *27 | 260.0161 | 3.02 | 1.68948 | 31.02 |
| *28 | 74.6498 | 25.50 | | |
| 29 | ∞ | 3.20 | 1.51680 | 64.20 |
| 30 | ∞ | 1.00 | | |

TABLE 8

Example 3

| | Infinity | 0.537 m |
|---|---|---|
| f | 91.68 | — |
| fnear | — | 81.87 |
| \|β\| | — | 0.17 |
| FNo. | 1.44 | 1.71 |
| 2ω(°) | 34.4 | 32.4 |
| DD[10] | 18.36 | 4.01 |
| DD[20] | 1.70 | 16.05 |

TABLE 9

Example 3

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 8.5561518E−06 | 1.2123440E−05 | −1.6146774E−05 | −1.5372830E−05 |
| A5 | 5.1398665E−08 | 2.6736643E−08 | 2.5003537E−07 | 1.9374519E−07 |
| A6 | 1.0894411E−08 | 1.3700993E−08 | 1.4381051E−08 | 2.0818481E−08 |
| A7 | 1.4346956E−10 | 2.0020644E−10 | −2.8703685E−10 | −3.0135642E−10 |
| A8 | −9.1281812E−12 | −9.5394724E−12 | 6.4989262E−12 | −4.9042963E−12 |
| A9 | −5.8628075E−13 | −6.4448811E−13 | 4.9254012E−14 | 9.5377905E−14 |
| A10 | −1.6582545E−14 | −1.7496621E−14 | −9.5782127E−15 | 2.9049292E−15 |
| A11 | −3.5827430E−16 | 1.9792255E−16 | −3.7783369E−16 | 2.0676125E−16 |
| A12 | −8.2315072E−18 | 1.7838262E−17 | −1.1888951E−17 | −1.4313883E−17 |
| A13 | 1.1923018E−18 | 1.2612032E−18 | 2.7938055E−19 | −1.0883303E−18 |
| A14 | 6.3247475E−20 | 3.1659589E−20 | 3.4825256E−20 | −9.2743651E−21 |
| A15 | 2.6077150E−21 | −1.3001518E−21 | −1.3457714E−22 | 1.0590982E−21 |
| A16 | 2.8871637E−23 | −1.1542345E−22 | 1.6630771E−23 | 8.7169301E−23 |
| A17 | −5.6518832E−24 | −1.7002657E−24 | 3.7946948E−25 | 2.5391756E−24 |
| A18 | −3.7383857E−25 | 2.4550320E−25 | −5.9493408E−26 | −1.8056199E−25 |
| A19 | 1.1415152E−27 | −5.2443156E−27 | 0.0000000E+00 | 0.0000000E+00 |
| A20 | 4.8783970E−28 | 1.4280366E−28 | 0.0000000E+00 | 0.0000000E+00 |

TABLE 10

Example 4

| Sn | R | D | Nd | vd |
|---|---|---|---|---|
| 1 | 96.3198 | 6.31 | 2.00272 | 19.32 |
| 2 | 296.9315 | 0.15 | | |
| 3 | 56.9835 | 5.00 | 1.49700 | 81.54 |
| 4 | 81.6191 | 3.00 | | |
| 5 | 120.5885 | 2.00 | 1.63980 | 34.47 |
| 6 | 47.0088 | 7.30 | | |
| 7 | 241.5805 | 4.85 | 1.87070 | 40.73 |
| 8 | −167.9267 | 1.70 | 1.89286 | 20.36 |
| 9 | 81.3917 | 1.01 | | |
| 10 | 92.2320 | 3.80 | 1.90366 | 31.31 |
| 11 | 221.0199 | 4.00 | | |
| 12(St) | ∞ | DD[12] | | |
| 13 | 60.5274 | 4.63 | 2.00272 | 19.32 |
| 14 | 146.5635 | 0.15 | | |
| 15 | 75.2797 | 7.92 | 1.49700 | 81.54 |
| 16 | −121.1586 | 1.50 | 1.74077 | 27.79 |
| 17 | 48.2221 | 11.89 | | |
| 18 | −36.3175 | 2.16 | 1.80809 | 22.76 |
| 19 | 144.4083 | 11.48 | 1.65844 | 50.88 |
| 20 | −59.1899 | 0.15 | | |
| 21 | −245.0172 | 5.17 | 1.95906 | 17.47 |
| 22 | −72.4984 | 0.15 | | |
| 23 | 115.0585 | 9.67 | 1.49700 | 81.54 |
| 24 | −91.4347 | DD[24] | | |

Example 4

Figure 4:
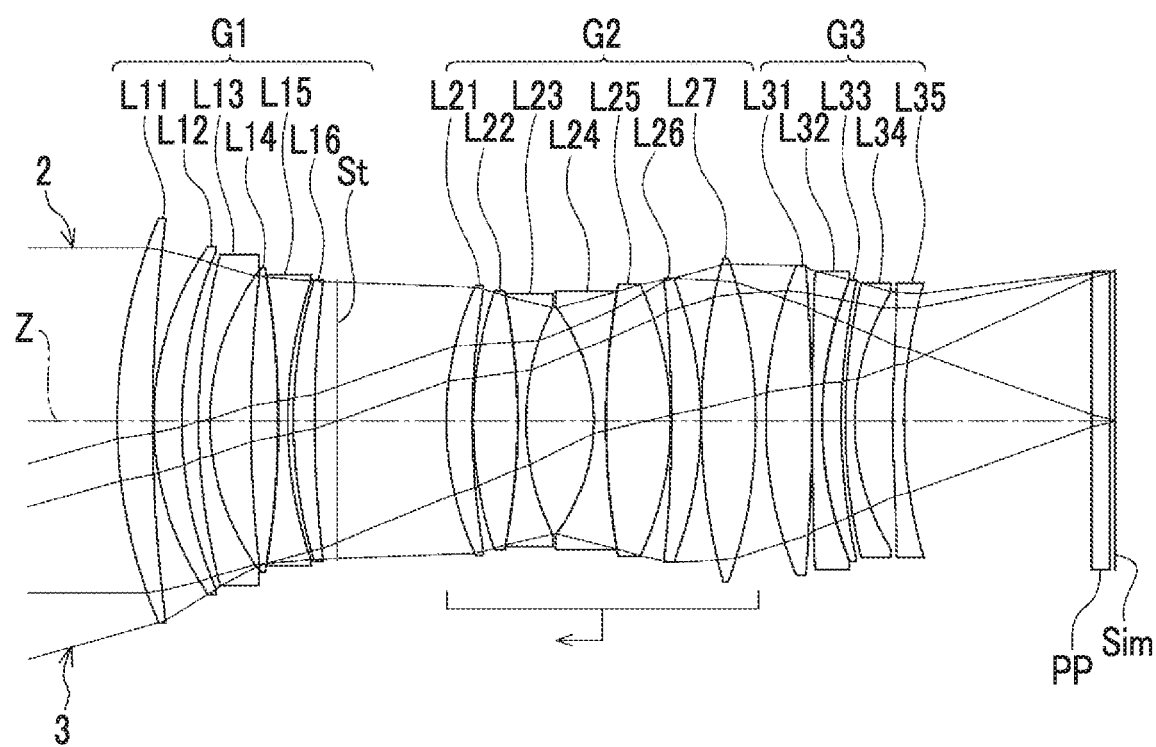
FIG. 4 is a cross-sectional view illustrating a configuration of an imaging lens of Example 4 of the present invention.
Figure 10:
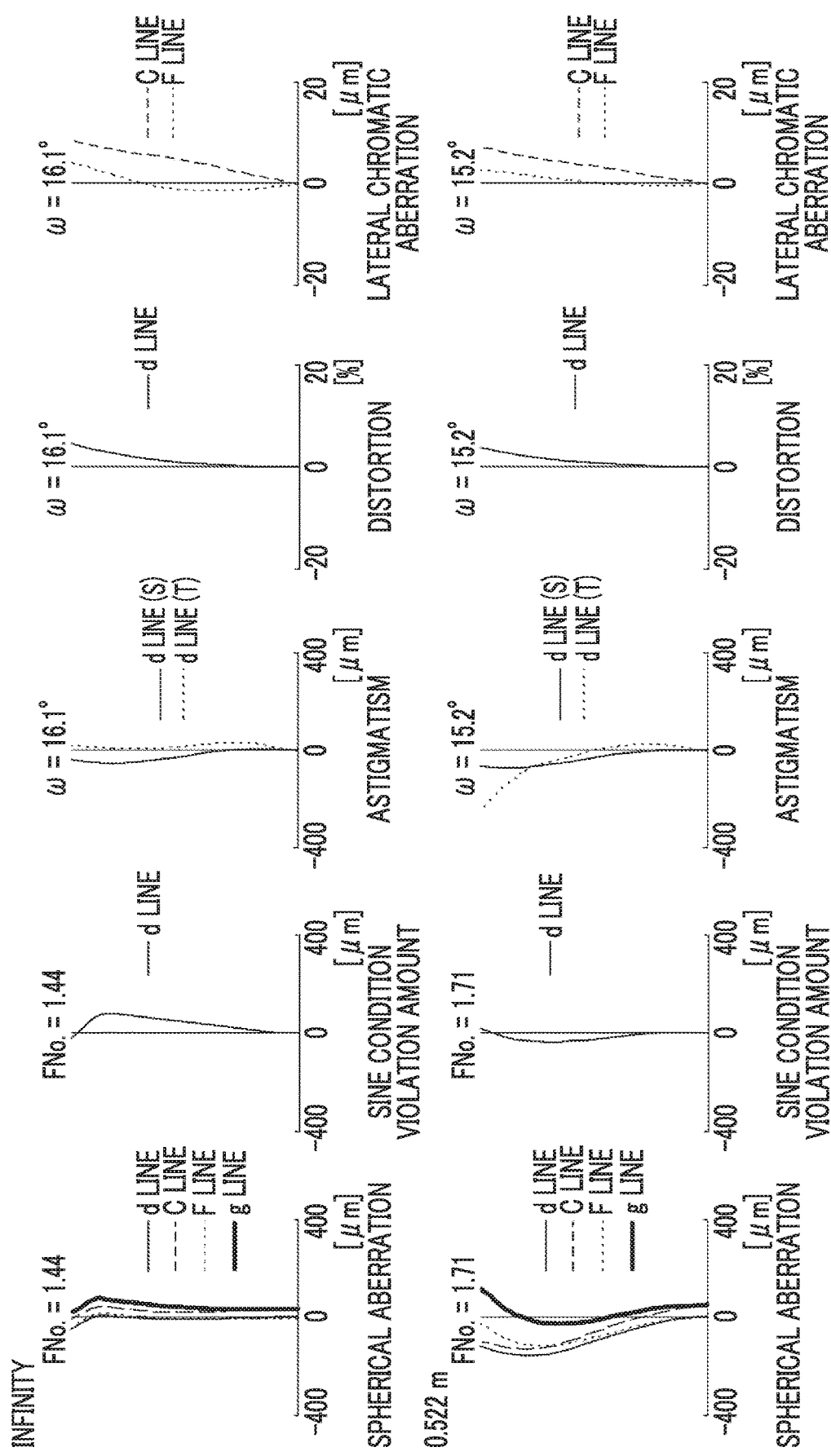
FIG. 10 is a diagram of aberrations of the imaging lens of Example 4 of the present invention.

FIG. 4 is a cross-sectional view illustrating a configuration of the imaging lens of Example 4. The imaging lens of Example 4 has the same configuration as the outline of the imaging lens of Example 1. The first lens group G1 includes, in order from the object side to the image side, six lenses L11 to L16 and an aperture stop St. The second lens group G2 consists of, in order from the object side to the image side, seven lenses L21 to L27. The third lens group G3 consists of, in order from the object side to the image side, five lenses L31 to L35. Table 10 shows basic lens data of the imaging lens of Example 4, Table 11 shows a specification and variable surface distances, Table 12 shows aspheric surface coefficients, and FIG. 10 shows aberration diagrams. In FIG. 10, aberration diagrams in a state in which an object at infinity is in focus are shown in the upper part, and aberration diagrams in a state in which the object at the object distance of 0.522 m (meters) is in focus are in the lower part.

TABLE 10-continued

Example 4

| Sn | R | D | Nd | vd |
|---|---|---|---|---|
| 25 | 76.0704 | 8.34 | 1.81600 | 46.62 |
| 26 | −389.8390 | 0.10 | | |
| 27 | 726.2021 | 1.76 | 1.67300 | 38.26 |
| 28 | 70.1373 | 3.37 | 2.00100 | 29.13 |
| 29 | 119.4884 | 0.74 | | |
| 30 | 112.5814 | 1.67 | 1.72047 | 34.71 |
| 31 | 46.1672 | 6.76 | | |
| *32 | 184.6950 | 2.00 | 1.80139 | 45.45 |
| *33 | 87.2134 | 33.37 | | |
| 34 | ∞ | 3.20 | 1.51680 | 64.20 |
| 35 | ∞ | 1.00 | | |

TABLE 11

Example 4

| | Infinity | 0.522 m |
|---|---|---|
| f | 90.69 | — |
| fnear | — | 85.25 |
| $\|\beta\|$ | — | 0.17 |
| FNo. | 1.44 | 1.71 |
| 2ω(°) | 32.2 | 30.4 |
| DD[12] | 19.52 | 1.28 |
| DD[24] | 1.75 | 19.99 |

TABLE 12

Example 4

| Sn | 32 | 33 |
|---|---|---|
| KA | 1.0000000E+00 | 1.0000000E+00 |
| A3 | 0.0000000E+00 | 0.0000000E+00 |
| A4 | −2.8542387E−06 | −4.4946748E−07 |
| A5 | 1.1438446E−08 | −4.1638264E−08 |
| A6 | −7.8978150E−10 | 2.0418984E−09 |
| A7 | 3.6695345E−12 | 7.2150774E−12 |
| A8 | 4.5431667E−13 | −7.7607811E−13 |
| A9 | 4.7979237E−15 | −1.4904222E−14 |
| A10 | −2.3827989E−16 | 2.4260238E−16 |
| A11 | −1.0951538E−17 | 2.2235200E−17 |
| A12 | −1.0260798E−19 | 6.9325533E−19 |
| A13 | 1.0991713E−20 | 8.4576603E−21 |
| A14 | 7.3915527E−22 | −2.6261810E−22 |
| A15 | 2.4943114E−23 | −1.6291929E−23 |
| A16 | 3.2086520E−25 | −2.3211400E−25 |
| A17 | −2.0337501E−26 | 1.8028026E−26 |
| A18 | −1.6773109E−27 | 1.3318048E−27 |
| A19 | −5.4383756E−29 | 1.7501173E−29 |
| A20 | 1.2680289E−30 | −4.6440250E−30 |

Example 5

Figure 5:
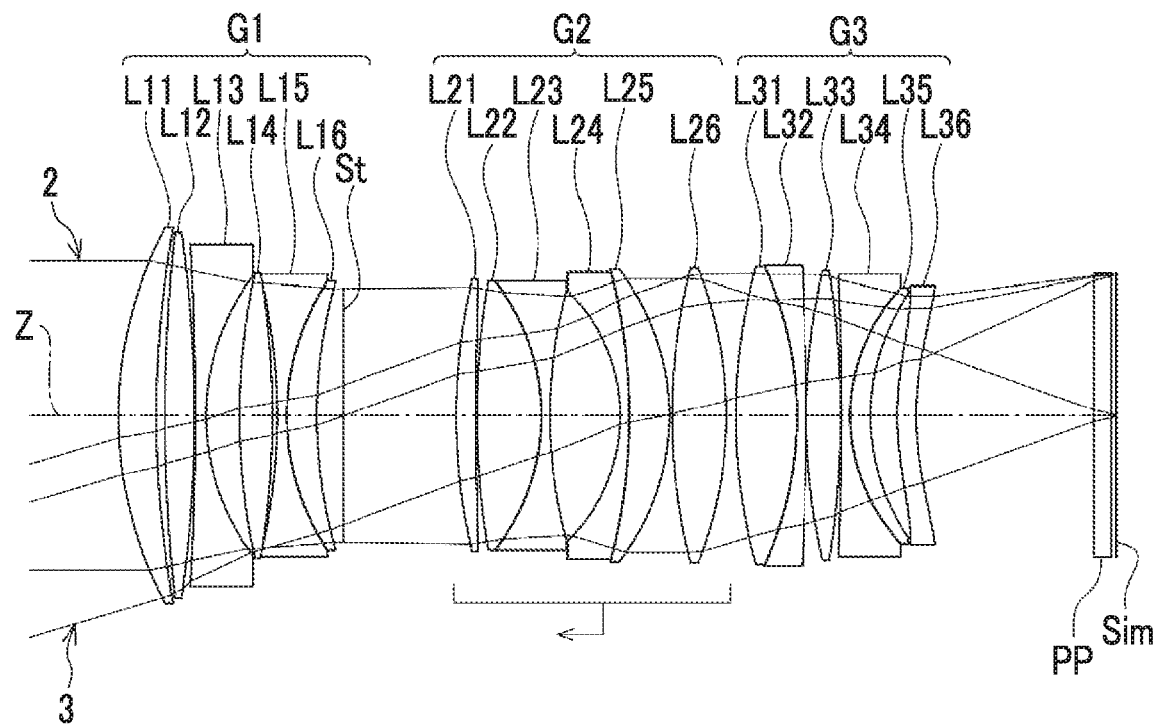
FIG. 5 is a cross-sectional view illustrating a configuration of an imaging lens of Example 5 of the present invention.
Figure 11:
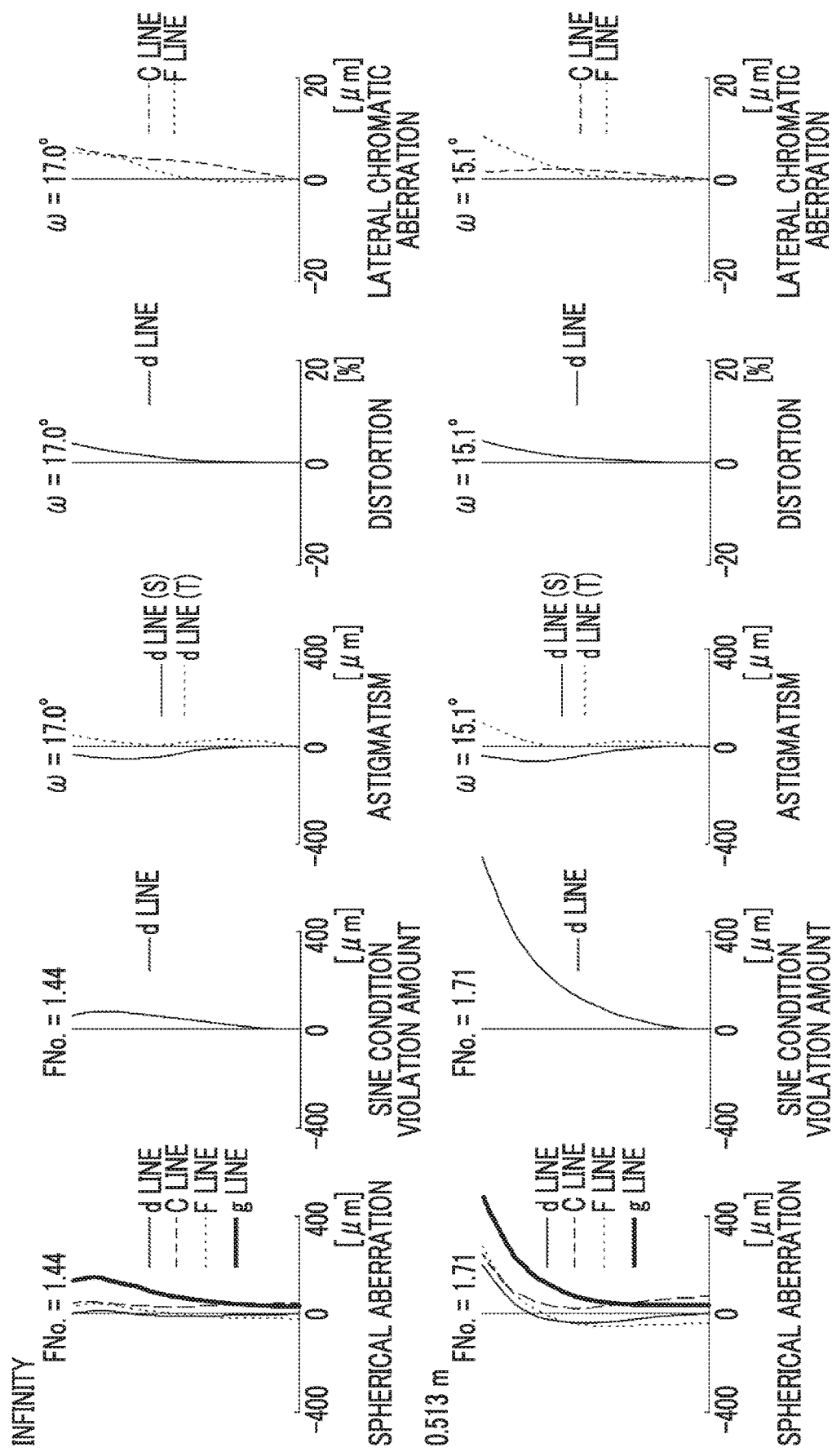
FIG. 11 is a diagram of aberrations of the imaging lens of Example 5 of the present invention.

FIG. 5 is a cross-sectional view illustrating a configuration of the imaging lens of Example 5. The imaging lens of Example 5 has the same configuration as the outline of the imaging lens of Example 1. The first lens group G1 includes, in order from the object side to the image side, six lenses L11 to L16 and an aperture stop St. The second lens group G2 consists of, in order from the object side to the image side, six lenses L21 to L26. The third lens group G3 consists of, in order from the object side to the image side, six lenses L31 to L36. Table 13 shows basic lens data of the imaging lens of Example 5, Table 14 shows a specification and variable surface distances, Table 15 shows aspheric surface coefficients, and FIG. 11 shows aberration diagrams. In FIG. 11, aberration diagrams in a state in which an object at infinity is in focus are shown in the upper part, and aberration diagrams in a state in which the object at the object distance of 0.513 m (meters) is in focus are in the lower part.

TABLE 13

Example 5

| Sn | R | D | Nd | vd |
|---|---|---|---|---|
| 1 | 79.7020 | 7.08 | 2.00069 | 25.46 |
| 2 | 208.1927 | 1.61 | | |
| 3 | 323.7795 | 5.56 | 1.49700 | 81.54 |
| 4 | −255.3520 | 0.15 | | |
| 5 | −586.8370 | 2.00 | 1.53172 | 48.84 |
| 6 | 46.0647 | 6.29 | | |
| 7 | 133.7775 | 6.15 | 1.90043 | 37.37 |
| 8 | −175.7443 | 0.90 | | |
| 9 | −119.2966 | 1.79 | 1.74077 | 27.79 |
| 10 | 48.0665 | 5.63 | 1.88300 | 40.76 |
| 11 | 97.2389 | 5.00 | | |
| 12(St) | ∞ | DD[12] | | |
| 13 | 118.3626 | 3.69 | 2.00069 | 25.46 |
| 14 | 919.1593 | 0.15 | | |
| 15 | 155.4376 | 12.12 | 1.49700 | 81.54 |
| 16 | −43.2257 | 1.57 | 1.69895 | 30.13 |
| 17 | 94.6669 | 13.02 | | |
| 18 | −34.9995 | 1.69 | 1.51742 | 52.43 |
| 19 | −113.9765 | 7.50 | 1.90043 | 37.37 |
| 20 | −47.1389 | 0.50 | | |
| 21 | 118.9030 | 10.17 | 1.49700 | 81.54 |
| 22 | −79.7618 | DD[22] | | |
| 23 | 110.4691 | 11.50 | 1.49700 | 81.54 |
| 24 | −71.3599 | 1.75 | 1.76182 | 26.52 |
| 25 | −610.8861 | 0.10 | | |
| 26 | 128.3419 | 6.49 | 2.00272 | 19.32 |
| 27 | −185.1127 | 0.15 | | |
| 28 | −632.8778 | 1.66 | 1.67270 | 32.10 |
| 29 | 36.9776 | 3.82 | 1.78800 | 47.37 |
| 30 | 42.9226 | 5.00 | | |
| *31 | 62.2822 | 3.50 | 1.80139 | 45.45 |
| *32 | 58.0280 | 33.36 | | |
| 33 | ∞ | 3.20 | 1.51680 | 64.20 |
| 34 | ∞ | 1.00 | | |

TABLE 14

Example 5

| | at infinity | 0.513 m |
|---|---|---|
| f | 85.93 | — |
| fnear | — | 85.48 |
| $\|\beta\|$ | — | 0.18 |
| FNo. | 1.44 | 1.71 |
| 2ω(°) | 34.0 | 30.2 |
| DD[12] | 21.30 | 0.90 |
| DD[22] | 1.75 | 22.15 |

TABLE 15

Example 5

| Sn | 31 | 32 |
|---|---|---|
| KA | 1.0000000E+00 | 1.0000000E+00 |
| A3 | 0.0000000E+00 | 0.0000000E+00 |
| A4 | −4.8848629E−06 | −3.5040560E−06 |
| A5 | −5.9531555E−08 | −9.4650882E−08 |
| A6 | −1.6911446E−09 | −6.3778403E−10 |
| A7 | −2.7509559E−11 | 4.9226155E−12 |
| A8 | −6.9194162E−14 | 4.3333970E−13 |
| A9 | 1.5676540E−14 | 1.8470639E−14 |
| A10 | 8.3339774E−16 | 7.1468814E−16 |
| A11 | 3.1764446E−17 | 2.6700833E−17 |
| A12 | 1.0632094E−18 | 9.6762480E−19 |
| A13 | 3.2780718E−20 | 3.3475808E−20 |
| A14 | 9.2335503E−22 | 1.0843706E−21 |
| A15 | 2.1895632E−23 | 3.1342021E−23 |
| A16 | 2.9578202E−25 | 6.9434672E−25 |
| A17 | −1.0820804E−26 | 1.7690852E−27 |
| A18 | −1.3221125E−27 | −1.1520714E−27 |
| A19 | −8.8151660E−29 | −1.0410652E−28 |
| A20 | −4.9461406E−30 | −6.9084035E−30 |

Example 6

Figure 6:
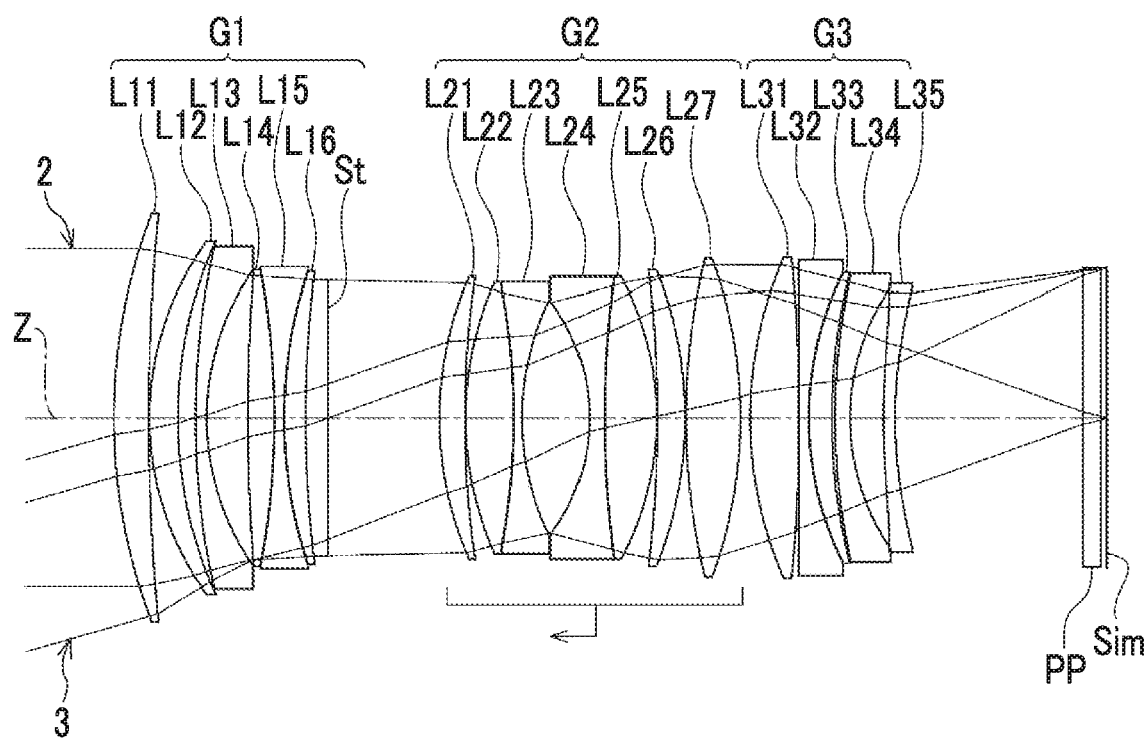
FIG. 6 is a cross-sectional view illustrating a configuration of an imaging lens of Example 6 of the present invention.
Figure 12:
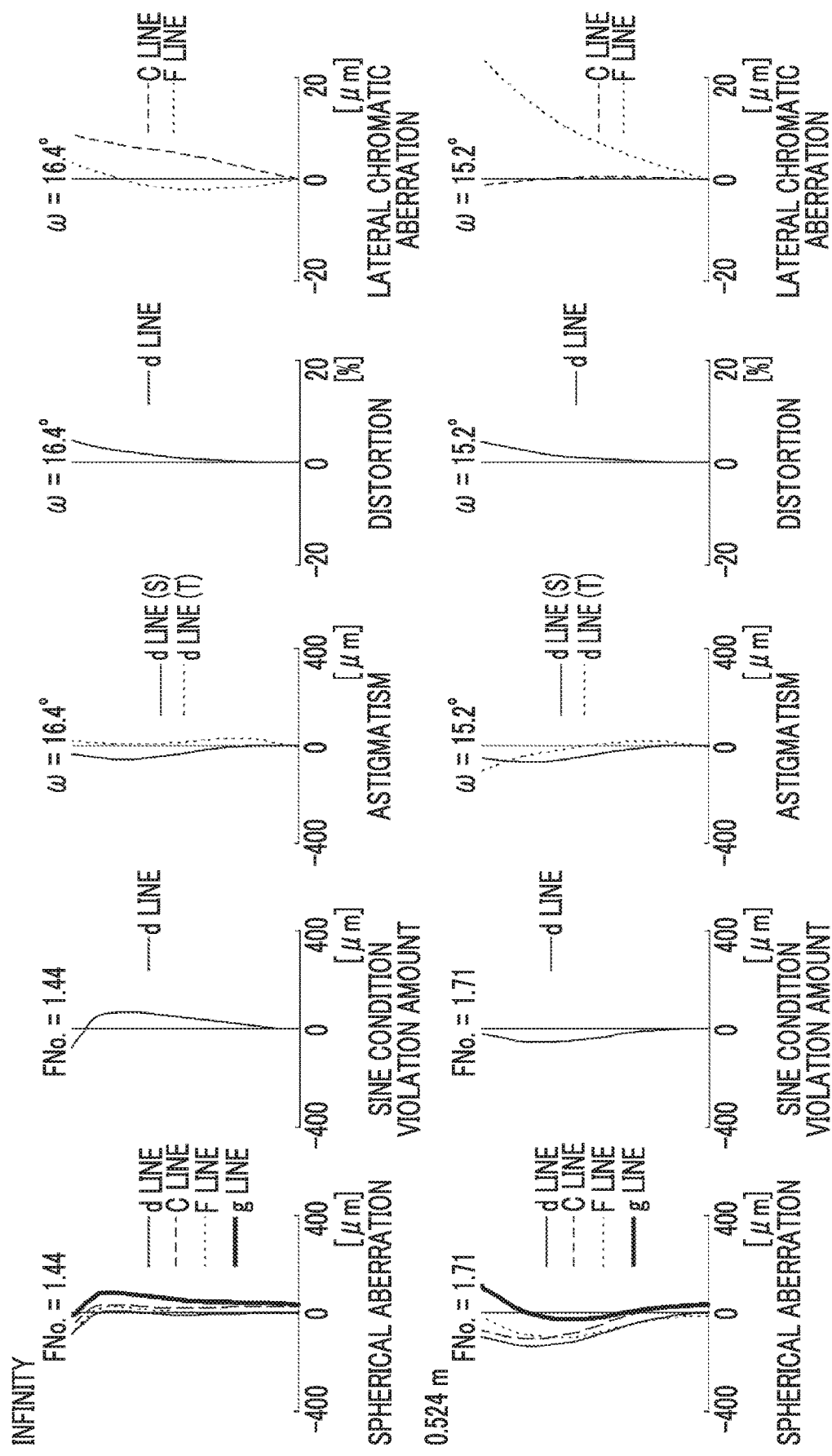
FIG. 12 is a diagram of aberrations of the imaging lens of Example 6 of the present invention.

FIG. 6 is a cross-sectional view illustrating a configuration of the imaging lens of Example 6. The imaging lens of Example 6 has the same configuration as the outline of the imaging lens of Example 1. The first lens group G1 includes, in order from the object side to the image side, six lenses L11 to L16 and an aperture stop St. The second lens group G2 consists of, in order from the object side to the image side, seven lenses L21 to L27. The third lens group G3 consists of, in order from the object side to the image side, five lenses L31 to L35. Table 16 shows basic lens data of the imaging lens of Example 6, Table 17 shows a specification and variable surface distances, Table 18 shows aspheric surface coefficients, and FIG. 12 shows aberration diagrams. In FIG. 12, aberration diagrams in a state in which an object at infinity is in focus are shown in the upper part, and aberration diagrams in a state in which the object at the object distance of 0.524 m (meters) is in focus are in the lower part.

TABLE 16

Example 6

| Sn | R | D | Nd | νd |
|---|---|---|---|---|
| 1 | 106.7845 | 6.18 | 2.00272 | 19.32 |
| 2 | 399.0308 | 0.15 | | |
| 3 | 56.4233 | 5.00 | 1.49700 | 81.54 |
| 4 | 80.6266 | 3.14 | | |
| 5 | 147.2669 | 2.00 | 1.62588 | 35.70 |
| 6 | 48.5271 | 7.30 | | |
| 7 | 359.3174 | 4.72 | 1.87070 | 40.73 |
| 8 | −146.2927 | 1.71 | 1.89286 | 20.36 |
| 9 | 87.0089 | 3.80 | 1.90366 | 31.31 |
| 10 | 218.6924 | 4.00 | | |
| 11(St) | ∞ | DD[11] | | |
| 12 | 65.8202 | 4.50 | 2.00272 | 19.32 |
| 13 | 178.7695 | 0.15 | | |
| 14 | 62.6973 | 8.51 | 1.41390 | 100.82 |
| 15 | −132.5748 | 1.50 | 1.74077 | 27.79 |
| 16 | 50.6190 | 11.86 | | |
| 17 | −36.4145 | 2.64 | 1.80809 | 22.76 |
| 18 | 195.9083 | 9.22 | 1.67003 | 47.23 |
| 19 | −55.6527 | 0.15 | | |
| 20 | −225.1532 | 4.89 | 1.98613 | 16.48 |
| 21 | −74.5255 | 0.15 | | |
| 22 | 127.3053 | 9.65 | 1.49700 | 81.54 |
| 23 | −86.5913 | DD[23] | | |
| 24 | 75.1724 | 8.70 | 1.81600 | 46.62 |
| 25 | −310.6693 | 0.10 | | |
| 26 | −6875.4505 | 1.76 | 1.67300 | 38.26 |
| 27 | 60.5897 | 4.09 | 2.00100 | 29.13 |
| 28 | 112.1781 | 0.57 | | |
| 29 | 123.7685 | 2.67 | 1.69895 | 30.13 |
| 30 | 43.2680 | 5.89 | | |

TABLE 16-continued

Example 6

| Sn | R | D | Nd | νd |
|---|---|---|---|---|
| *31 | 127.8782 | 2.09 | 1.80139 | 45.45 |
| *32 | 83.2315 | 33.37 | | |
| 33 | ∞ | 3.20 | 1.51680 | 64.20 |
| 34 | ∞ | 1.00 | | |

TABLE 17

Example 6

| | Infinity | 0.524 m |
|---|---|---|
| f | 88.77 | — |
| fnear | — | 84.82 |
| \|β\| | — | 0.17 |
| FNo. | 1.44 | 1.71 |
| 2ω(°) | 32.8 | 30.4 |
| DD[11] | 19.92 | 1.28 |
| DD[23] | 1.75 | 20.39 |

TABLE 18

Example 6

| Sn | 31 | 32 |
|---|---|---|
| KA | 1.0000000E+00 | 1.0000000E+00 |
| A3 | 0.0000000E+00 | 0.0000000E+00 |
| A4 | −3.1272446E−06 | −9.1735147E−07 |
| A5 | −1.3711463E−09 | −5.4182198E−08 |
| A6 | −1.2093130E−09 | 1.7073127E−09 |
| A7 | 6.3897283E−13 | 6.6513112E−14 |
| A8 | 5.2782696E−13 | −7.4691660E−13 |
| A9 | 8.5611223E−15 | −5.1247042E−15 |
| A10 | −8.8801344E−17 | 6.8981422E−16 |
| A11 | −3.8681636E−18 | 3.6263290E−17 |
| A12 | 2.1089784E−19 | 7.9594354E−19 |
| A13 | 2.3574859E−20 | 1.0312891E−20 |
| A14 | 1.1249124E−21 | −2.6184565E−22 |
| A15 | 3.2188386E−23 | −1.6985732E−23 |
| A16 | 2.2554743E−25 | −2.5468088E−25 |
| A17 | −3.7019799E−26 | 2.2647029E−26 |
| A18 | −2.5575427E−27 | 1.7235093E−27 |
| A19 | −7.8644346E−29 | 1.9765753E−29 |
| A20 | 1.7471730E−30 | −6.3619190E−30 |

Table 19 shows values corresponding to Conditional Expressions (1) to (7) of the imaging lenses of Examples 1 to 6. In Examples 1 to 6, the d line is set as the reference wavelength. Table 19 shows the values on the d line basis.

TABLE 19

| Expression Number | | Example 1 | Example 2 | Example 3 | Example 4 | Example 5 | Example 6 |
|---|---|---|---|---|---|---|---|
| (1) | f/fR | −0.407 | −0.338 | −0.599 | −0.436 | −0.051 | −0.292 |
| (2) | f/f1 | 0.100 | 0.020 | 0.225 | 0.142 | 0.011 | 0.088 |
| (3) | f/f3 | −0.133 | −0.041 | −0.439 | −0.16 | −0.011 | −0.129 |
| (4) | ν1 | 81.5 | 81.5 | 94.7 | 81.5 | 81.5 | 81.5 |
| (5) | ν2 | 81.5 | 81.5 | 67.7 | 81.5 | 81.5 | 101.0 |
| (6) | f/f2 | 1.059 | 1.026 | 1.429 | 1.096 | 1.029 | 1.064 |
| (7) | \|f2/f3\| | 0.126 | 0.040 | 0.307 | 0.131 | 0.011 | 0.121 |

Figure 13:
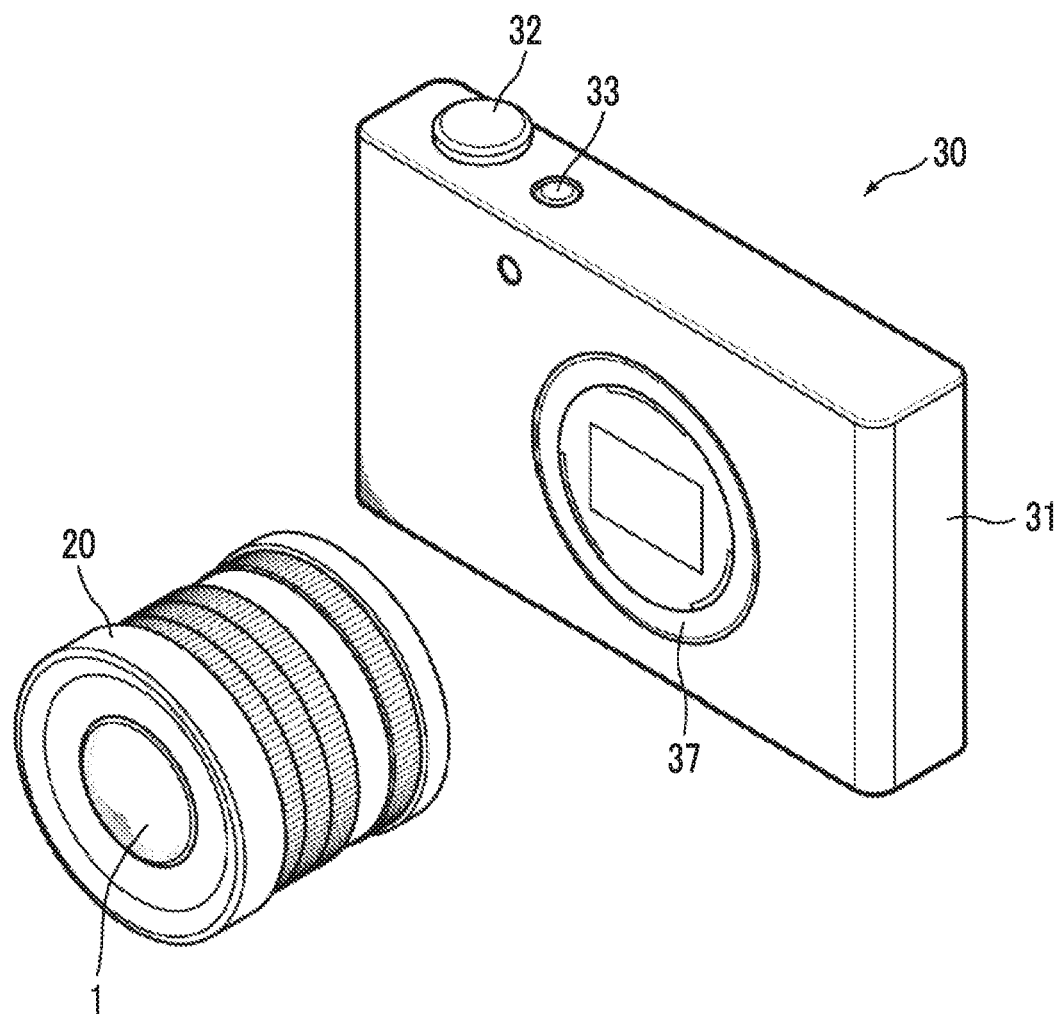
FIG. 13 is a perspective view of the front side of an imaging apparatus according to an embodiment of the present invention.
Figure 14:
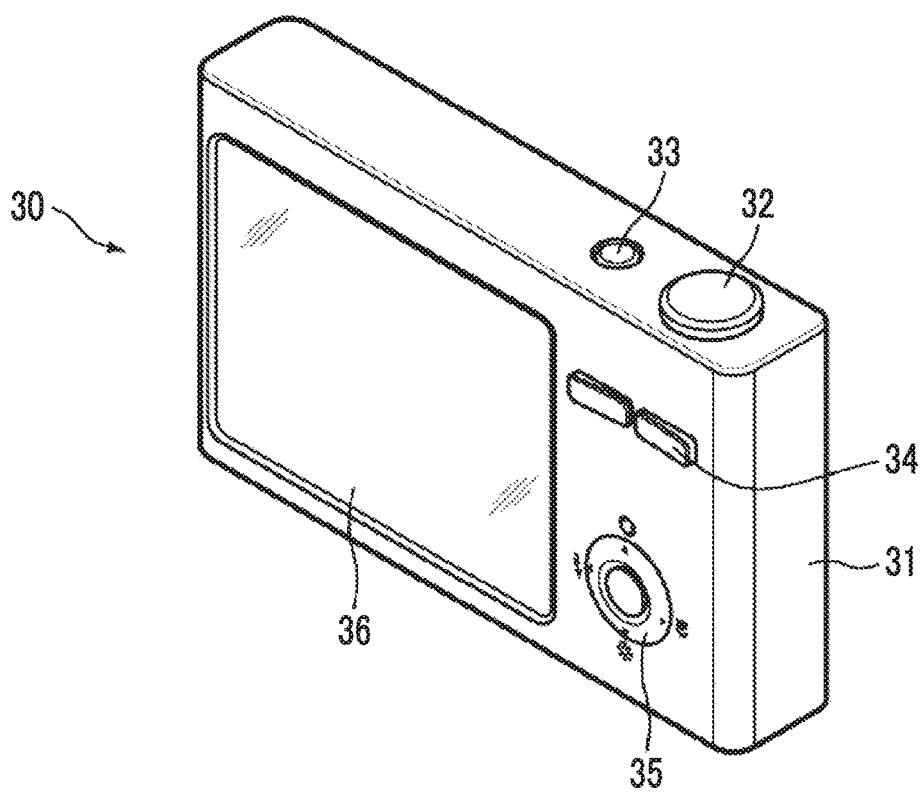
FIG. 14 is a perspective view of the rear side of an imaging apparatus according to an embodiment of the present invention.

As can be seen from the above data, in the imaging lenses of Examples 1 to 6, the F number in a state of focusing on the object at infinity is 1.44, the F number is small, and the absolute value of the maximum imaging magnification in a state of focusing on the closest object is 0.17 to 0.18, which is a relatively large maximum imaging magnification, and various aberrations are satisfactorily corrected to achieve high optical performance Next, an imaging apparatus according to an embodiment of the present invention will be described. FIGS. 13 and 14 are external views of a camera 30 which is the imaging apparatus according to the embodiment of the present invention. FIG. 13 is a perspective view of the camera 30 viewed from the front side, and FIG. 14 is a perspective view of the camera 30 viewed from the rear side. The camera 30 is a mirrorless type digital camera to which the interchangeable lens 20 is detachably mounted. The interchangeable lens 20 is configured to include the imaging lens 1 according to the embodiment of the present invention housed in a lens barrel.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present invention is not limited to the above examples, and may be modified into various forms such as cameras other than a mirrorless type, a film camera, and a video camera.

What is claimed is:

1. An imaging lens consisting of, in order from an object side to an image side:
   a first lens group that has a positive refractive power;
   a second lens group that has a positive refractive power; and
   a third lens group that has a negative refractive power,
   wherein during focusing from an object at infinity to a closest object, the first lens group and the third lens group remain stationary with respect to an image plane, and the second lens group moves along an optical axis,
   the first lens group includes a stop,
   the second lens group includes one or more cemented lenses in which a negative lens and positive lenses are cemented, and the number of the positive lenses included in the second lens group is equal to or greater than three, and assuming that an Abbe number of the positive lens of the first lens group based on a d line is v1, the first lens group includes a positive lens which satisfies Conditional Expression (4) represented by $$70<v1<110 \tag{4}$$

2. The imaging lens according to claim 1, wherein a lens closest to the image side is a negative lens.

3. The imaging lens according to claim 2, wherein assuming that
   a focal length of the imaging lens during focusing on the object at infinity is f, and
   a focal length of the negative lens closest to the image side is fR,
   Conditional Expression (1) is satisfied, which is represented by $$-1.5<f/fR<-0.02 \tag{1}$$

4. The imaging lens according to claim 1, wherein assuming that
   a focal length of the imaging lens during focusing on the object at infinity is f, and
   a focal length of the first lens group is f1,
   Conditional Expression (2) is satisfied, which is represented by $$0.005<f/f1<0.5 \tag{2}$$

5. The imaging lens according to claim 1, wherein assuming that
   a focal length of the imaging lens during focusing on the object at infinity is f, and
   a focal length of the third lens group is f3,
   Conditional Expression (3) is satisfied, which is represented by $$-0.5<f/f3<0 \tag{3}$$

6. The imaging lens according to claim 1, wherein a lens closest to the object side is a positive lens.

7. The imaging lens according to claim 6, wherein a lens which is the second from the object side is a positive lens.

8. The imaging lens according to claim 1, wherein a lens surface closest to the image side in the first lens group is a concave surface.

9. The imaging lens according to claim 1, wherein assuming that
   a focal length of the imaging lens during focusing on the object at infinity is f, and
   a focal length of the second lens group is f2,
   Conditional Expression (6) is satisfied, which is represented by $$1<f/f2<2 \tag{6}$$

10. The imaging lens according to claim 1, wherein at least one of the cemented lenses in the second lens group is formed by cementing a negative lens having a concave surface on the object side and a positive lens having a convex surface on the image side in order from the object side.

11. The imaging lens according to claim 1, wherein a lens surface closest to the image side is a concave surface.

12. The imaging lens according to claim 1, wherein assuming that a focal length of the second lens group is f2, and
a focal length of the third lens group is f3,
Conditional Expression (7) is satisfied, which is represented by $$0.01<|f2/f3|<0.35 \qquad (7).$$

13. The imaging lens according to claim 3, wherein Conditional Expression (1-1) is satisfied, which is represented by $$-1<f/fR<-0.02 \qquad (1\text{-}1).$$

14. The imaging lens according to claim 4, wherein Conditional Expression (2-1) is satisfied, which is represented by $$0.01<f/f1<0.3 \qquad (2\text{-}1).$$

15. The imaging lens according to claim 5, wherein Conditional Expression (3-1) is satisfied, which is represented by $$-0.45<f/f3<0 \qquad (3\text{-}1).$$

16. The imaging lens according to claim 1,
wherein the second lens group consists of, in order from the object side to the image side, a positive lens, a first cemented lens, a second cemented lens, and one or more positive lenses,
wherein the first cemented lens is formed by cementing a positive lens and a negative lens in order from the object side, and
wherein the second cemented lens is formed by cementing a negative lens and a positive lens in order from the object side.

17. An imaging lens consisting of, in order from an object side to an image side:
a first lens group that has a positive refractive power;
a second lens group that has a positive refractive power; and
a third lens group that has a negative refractive power, wherein
during focusing from an object at infinity to a closest object, the first lens group and the third lens group remain stationary with respect to an image plane, and the second lens group moves along an optical axis,
the first lens group includes a stop,
the second lens group includes one or more cemented lenses in which a negative lens and positive lenses are cemented, and the number of the positive lenses included in the second lens group is equal to or greater than three, and
assuming that an Abbe number of the positive lens of the second lens group based on a d line is v2, the second lens group includes a positive lens which satisfies Conditional Expression (5) represented by $$65<v2<110 \qquad (5).$$

18. An imaging apparatus comprising the imaging lens according to claim 1.

19. An imaging lens consisting of, in order from an object side to an image side:
a first lens group that has a positive refractive power;
a second lens group that has a positive refractive power; and
a third lens group that has a negative refractive power, wherein
during focusing from an object at infinity to a closet object, the first lens group and the third lens group remain stationary with respect to an image plane, and the second lens group moves along an optical axis,
the first lens group includes a stop,
the second lens group includes one or more cemented lenses in which a negative lens and positive lenses are cemented, and the number of the positive lenses included in the second lens group is equal to or greater than three, and
assuming that an Abbe number of the positive lens of the second lens group based on a d line is v2, the second lens group includes a positive lens which satisfies Conditional Expression (5) represented by $$65<v2<110 \qquad (5).$$

* * * * *